US006572680B2

(12) United States Patent
Baker et al.

(10) Patent No.: US 6,572,680 B2
(45) Date of Patent: Jun. 3, 2003

(54) CARBON DIOXIDE GAS SEPARATION USING ORGANIC-VAPOR-RESISTANT MEMBRANES

(75) Inventors: Richard W. Baker, Palo Alto, CA (US); Ingo Pinnau, Palo Alto, CA (US); Zhenjie He, Fremont, CA (US); Karl D. Amo, Mountain View, CA (US); Andre R. Da Costa, Menlo Park, CA (US); Ramin Daniels, San Jose, CA (US)

(73) Assignee: Membrane Technology and Research, Inc., Menlo Park, CA (US)

( * ) Notice: Subject to any disclaimer, the term of this patent is extended or adjusted under 35 U.S.C. 154(b) by 0 days.

(21) Appl. No.: 10/072,526

(22) Filed: Feb. 5, 2002

(65) Prior Publication Data

US 2002/0124722 A1 Sep. 12, 2002

Related U.S. Application Data

(63) Continuation-in-part of application No. 09/574,420, filed on May 19, 2000, now Pat. No. 6,361,583, and a continuation-in-part of application No. 09/574,303, filed on May 19, 2000, now Pat. No. 6,361,582.

(51) Int. Cl.$^7$ .......................... B01D 53/22; B01D 71/36
(52) U.S. Cl. ...................... 95/51; 95/45; 95/96; 95/230
(58) Field of Search ................. 95/45, 47–55, 95/96–106, 230

(56) References Cited

U.S. PATENT DOCUMENTS

| | | | |
|---|---|---|---|
| 3,133,132 A | 5/1964 | Loeb et al. ...................... 264/49 |
| 3,246,450 A * | 4/1966 | Stern et al. ...................... 95/55 |
| 3,308,107 A | 3/1967 | Selman et al. ............. 260/87.5 |
| 3,488,335 A | 1/1970 | Braun ........................ 260/88.3 |
| 3,651,618 A * | 3/1972 | Klein et al. .................. 95/45 X |
| 3,798,185 A | 3/1974 | Skiens et al. ................. 260/2.5 |
| 3,865,845 A | 2/1975 | Resnick ................... 260/340.9 |
| 4,230,463 A | 10/1980 | Henis et al. .................... 55/16 |
| 4,243,701 A | 1/1981 | Riley et al. .................. 427/244 |
| 4,398,926 A * | 8/1983 | Doshi ........................... 95/55 |
| 4,399,264 A | 8/1983 | Squire ........................ 526/247 |
| 4,431,786 A | 2/1984 | Squire ........................ 526/247 |
| 4,548,619 A * | 10/1985 | Steacy ............................ 95/55 |
| 4,565,855 A | 1/1986 | Anderson et al. ........... 526/247 |
| 4,594,399 A | 6/1986 | Anderson et al. ........... 526/247 |
| 4,654,063 A * | 3/1987 | Auvil et al. ................ 95/55 X |
| 4,690,695 A * | 9/1987 | Doshi ............................ 95/55 |
| 4,754,009 A | 6/1988 | Squire ........................ 526/247 |
| 4,863,761 A | 9/1989 | Puri ............................ 427/175 |
| 4,880,442 A * | 11/1989 | Hayes ............................ 55/16 |
| 4,892,564 A * | 1/1990 | Cooley ........................... 95/55 |
| 4,897,457 A | 1/1990 | Nakamura et al. .......... 526/247 |
| 4,910,276 A | 3/1990 | Nakamura et al. .......... 526/247 |
| 5,021,602 A | 6/1991 | Clement et al. ............. 558/230 |
| 5,051,113 A * | 9/1991 | Nemser ........................ 95/54 |
| 5,051,114 A | 9/1991 | Nemser et al. ................. 55/16 |
| 5,053,059 A * | 10/1991 | Nemser ........................ 95/54 |
| 5,117,272 A | 5/1992 | Nomura et al. ............... 357/52 |
| 5,141,642 A | 8/1992 | Kusuki et al. .............. 210/490 |
| 5,147,417 A * | 9/1992 | Nemser ........................ 95/54 |
| 5,156,888 A | 10/1992 | Haubs et al. ................ 427/163 |
| 5,242,636 A | 9/1993 | Sluma et al. ............... 264/45.8 |
| 5,268,411 A | 12/1993 | Yokotsuka et al. ......... 524/462 |
| 5,286,280 A * | 2/1994 | Chiou ........................ 95/51 X |
| 5,288,304 A * | 2/1994 | Koros et al. ................. 95/54 X |
| 5,318,417 A | 6/1994 | Kopp et al. ................... 425/97 |
| 5,407,466 A * | 4/1995 | Lokhandwala et al. ......... 95/49 |
| 5,498,682 A | 3/1996 | Navarrini et al. ........... 526/247 |
| 5,507,860 A * | 4/1996 | Rao et al. .................... 95/55 X |
| 5,510,406 A | 4/1996 | Matsuo et al. .............. 524/237 |
| 5,669,958 A * | 9/1997 | Baker et al. ................... 95/50 |
| 5,688,307 A * | 11/1997 | Pinnau et al. .................. 95/50 |
| 5,710,345 A | 1/1998 | Navarrini et al. ........... 568/596 |
| 5,772,733 A * | 6/1998 | Lokhandwala et al. ..... 95/50 X |
| 5,779,763 A * | 7/1998 | Pinnau et al. ............... 95/55 X |
| 5,883,177 A | 3/1999 | Colaianna et al. .......... 524/462 |
| 5,962,612 A | 10/1999 | Takakura et al. ........... 526/249 |
| 6,011,192 A | 1/2000 | Baker et al. ................ 585/818 |
| 6,040,419 A | 3/2000 | Drysdale et al. ............ 528/408 |
| 6,053,965 A * | 4/2000 | Lokhandwala ............. 95/50 X |
| 6,128,919 A * | 10/2000 | Daus et al. ................. 95/51 X |
| 6,161,386 A * | 12/2000 | Lokhandwala ............. 95/50 X |
| 6,361,582 B1 * | 3/2002 | Pinnau et al. .................. 95/45 |
| 6,361,583 B1 * | 3/2002 | Pinnau et al. .................. 95/45 |

FOREIGN PATENT DOCUMENTS

EP          0649676          4/1995

OTHER PUBLICATIONS

I. Pinnau et al., "Gas and Vapor Transport Propeties of Amorphous Perfluorinated Copolymer Membranes . . . ," J. Membrane Science, 109, p. 125–133 (1996).
A. Alentiev et al., "High Transport Parameters and Free Volume of Perfluorodioxole Copolymers," J. Membrane Science, 126, p. 123–132 (1997).
V. Arcella et al., "A Study on a Perfluoropolymer Purification and Its Application to Membrane Formation," J. Membrane Science, 163, p. 203–209 (1999).
J. Henis, "Chapter 10—Commercial and Practical Aspects of Gas Separation Membranes," in *Polymeric Gas Separation Membranes*, Paul and Yampol'skii (eds.), CRC Press (1994).
S. Ando et al., "Perfluorinated Polymers for Optical Waveguides," Chemtech, Dec. 1994, p. 20–27.

* cited by examiner

Primary Examiner—Robert H. Spitzer
(74) Attorney, Agent, or Firm—J. Farrant

(57) ABSTRACT

A process for separating carbon dioxide from a multicomponent gas mixture containing carbon dioxide and a hydrocarbon, such as natural gas or associated gas, using gas-separation membranes selective for carbon dioxide over the hydrocarbon. The membranes use a selective layer made from a polymer having repeating units of a fluorinated polymer, and demonstrate good resistance to plasticization by the organic components in the gas mixture under treatment, and good recovery after exposure to liquid aromatic hydrocarbons.

48 Claims, 9 Drawing Sheets

CARBON DIOXIDE GAS SEPARATION USING ORGANIC-VAPOR-RESISTANT MEMBRANES

This application is a continuation-in-part of Ser. No. 09/574,420, filed May 19, 2000, now U.S. Pat. No. 6,361,583, and Ser. No. 09/574,303 filed May 19, 2000, now U.S. Pat. No. 6,361,582, both of which are incorporated herein by reference in their entirety.

FIELD OF THE INVENTION

The invention relates to the separation of gases from hydrocarbon gas mixtures. In particular, the invention relates to the separation of carbon dioxide from hydrocarbons. The separation is carried out using hydrocarbon-resistant membranes, and is useful in natural gas processing plants and the like.

BACKGROUND OF THE INVENTION

Polymeric gas-separation membranes are well known and are in use in such areas as production of oxygen-enriched air, production of nitrogen from air, separation of carbon dioxide from methane, hydrogen recovery from various gas mixtures and removal of organic vapors from air or nitrogen.

The preferred membrane for use in any gas-separation application combines high selectivity with high flux. Thus, the membrane-making industry has engaged in an ongoing quest for polymers and membranes with improved selectivity/flux performance. Many polymeric materials are known that offer intrinsically attractive properties. That is, when the permeation performance of a small film of the material is measured under laboratory conditions, using pure gas samples and operating at modest temperature and pressure conditions, the film exhibits high permeability for some pure gases and low permeability for others, suggesting useful separation capability.

Unfortunately, gas separation in an industrial plant is seldom so simple. The gas mixtures to which the separation membranes are exposed may be hot, contaminated with solid or liquid particles, or at high pressure, may fluctuate in composition or flow rate or, more likely, may exhibit several of these features. Even in the most straightforward situation possible, where the gas stream to be separated is a two-component mix, uncontaminated by other components, at ambient temperature and moderate pressure, one component may interact with the membrane in such a way as to change the permeation characteristics of the other component, so that the separation factor or selectivity suggested by the pure gas measurements cannot be achieved.

In gas mixtures that contain condensable components, for example $C_{3+}$ hydrocarbons, it is frequently, although not always, the case that the mixed gas selectivity is lower, and at times considerably lower, than the ideal selectivity. The condensable component, which is readily sorbed into the polymer matrix, swells or, in the case of a glassy polymer, plasticizes the membrane, thereby reducing its selective capabilities. Carbon dioxide is also known to swell or plasticize many membrane materials. As a result of these effects, a technique for predicting mixed gas performance under real conditions from pure gas measurements with any reliability has not yet been developed.

A good example of an application in which membranes have difficulty delivering and maintaining adequate performance is the removal of carbon dioxide from natural gas. Natural gas provides more than one-fifth of all the primary energy used in the United States, but much raw gas is "subquality", that is, it exceeds the pipeline specifications in nitrogen, carbon dioxide and/or hydrogen sulfide content. In particular, about 10% of gas contains excess carbon dioxide. Membrane technology is attractive for removing this carbon dioxide, because many membrane materials are very permeable to carbon dioxide, and because treatment can be accomplished using the high wellhead gas pressure as the driving force for the separation.

However, since carbon dioxide readily sorbs into and interacts strongly with many polymers, and most natural gas contains at least some $C_{3+}$ hydrocarbons, the expectation is that the gas components will have a swelling or plasticizing effect, thereby adversely changing the membrane permeation characteristics. These issues are discussed, for example, in J. M. S. Henis, "Commercial and Practical Aspects of Gas Separation Membranes," Chapter 10 of D. R. Paul and Y. P. Yampol'skii, *Polymeric Gas Separation Membranes,* CRC Press, Boca Raton, 1994. This reference gives upper limits on various contaminants in streams to be treated by polysulfone membranes of 50 psi hydrogen sulfide, 5 psi ammonia, 10% saturation of aromatics, 25% saturation of olefins and 11° C. above paraffin dewpoint (pages 473–474).

In the past, cellulose acetate, which can provide a carbon dioxide/methane selectivity of about 10–20 in gas mixtures at pressure under favorable conditions, has been the membrane material of choice for this application, and about 100 plants using cellulose acetate membranes are believed to have been installed. Nevertheless, cellulose acetate membranes are not without problems. Natural gas often contains substantial amounts of water, either as entrained liquid, or in vapor form, which may lead to condensation within the membrane modules. However, contact with liquid water can cause the membrane selectivity to be lost completely, and exposure to water vapor at relative humidities greater than only about 20–30% can cause irreversible membrane compaction and loss of flux. The presence of hydrogen sulfide in conjunction with water vapor is also damaging, as are high levels of $C_{3+}$ hydrocarbons. These problems are presented in more detail in U.S. Pat. No. 5,407,466, columns 2–6, which patent is incorporated herein by reference.

Thus, the need remains for membranes that will provide and maintain adequate performance under conditions of exposure to organic vapors, particularly $C_{3+}$ hydrocarbons, in conjunction with high concentrations of acid gas and water vapor that are commonplace in natural gas treatment.

Films or membranes made from fluorinated polymers having a ring structure in the repeat unit are known. For example:

1. U.S. Pat. Nos. 4,897,457 and 4,910,276, both to Asahi Glass, disclose various perfluorinated polymers having repeating units of perfluorinated cyclic ethers, and cite the gas-permeation properties of certain of these, as in column 8, lines 48–60 of U.S. Pat. No. 4,910,276.

2. A paper entitled "A study on perfluoropolymer purification and its application to membrane formation" (V. Arcella et al., *Journal of Membrane Science,* Vol. 163, pages 203–209 (1999)) discusses the properties of membranes made from a copolymer of tetrafluoroethylene and a dioxole. Gas permeation data for various gases are cited.

3. European Patent Application 0 649 676 A1, to L'Air Liquide, discloses post-treatment of gas separation membranes by applying a layer of fluoropolymer, such as a perfluorinated dioxole, to seal holes or other defects in the membrane surface.

4. U.S. Pat. No. 5,051,114, to Du Pont, discloses gas separation methods using perfluoro-2,2-dimethyl-1,3- dioxole polymer membranes. This patent also discloses comparative data for membranes made from perfluoro(2-methylene-4-methyl-1,3-dioxolane) polymer (Example XI).

5. A paper entitled "Gas and vapor transport properties of amorphous perfluorinated copolymer membranes based on 2,2-bistrifluoromethyl-4,5-difluoro-1,3-dioxole/ tetrafluoroethylene" (I. Pinnau et al., *Journal of Membrane Science*, Vol. 109, pages 125–133 (1996)) discusses the free volume and gas permeation properties of fluorinated dioxole/tetrafluoroethylene copolymers compared with substituted acetylene polymers. This reference also shows the susceptibility of this dioxole polymer to plasticization by organic vapors and the loss of selectivity as vapor partial pressure in a gas mixture increases (FIGS. 3 and 4).

Most of the data reported in the prior art references listed above are for permanent gases, carbon dioxide and methane, and refer only to measurements made with pure gases. The data reported in item 5 indicate that even these fluorinated polymers, which are characterized by their chemical inertness, appear to be similar to conventional membranes in their inability to withstand exposure to propane and heavier hydrocarbons.

SUMMARY OF THE INVENTION

The invention is a process for separating carbon dioxide from a gaseous hydrocarbon in a gas mixture. Such a mixture might typically, but not necessarily, be encountered during the processing of natural gas, of associated gas from oil wells, or of certain petrochemical streams. The mixture is typically a multicomponent mixture, containing the gaseous hydrocarbon from which it is desired to separate carbon dioxide, as well as at least one other gaseous hydrocarbon and/or other component such as nitrogen, hydrogen sulfide or water vapor, for example.

The process is carried out by running a stream of the gas mixture across a membrane that is selective for carbon dioxide over the hydrocarbon from which it is to be separated. The process results, therefore, in a permeate stream enriched in carbon dioxide and a residue stream depleted in carbon dioxide. The process can separate carbon dioxide from methane, carbon dioxide from ethylene, carbon dioxide from ethane, carbon dioxide from $C_{3+}$ hydrocarbon vapors, or any combination of these, for example.

The process differs from previous carbon dioxide/ hydrocarbon separation processes in that:

(i) the membranes are able to maintain useful separation properties in the presence of organic vapors, particularly $C_{3+}$ hydrocarbon vapors, even at high levels in the gas mixture, (ii) the membranes are able to withstand high partial pressures of carbon dioxide, and (iii) the membranes can recover from accidental exposure to liquid organic compounds.

To provide these attributes, the membranes used in the process of the invention are made from a glassy polymer or copolymer. The polymer is characterized by having repeating units of a fluorinated, cyclic structure, the ring having at least five members. The polymer is further characterized by a fractional free volume no greater than about 0.3 and preferably by a glass transition temperature, Tg, of at least about 100° C. Preferably, the polymer is perfluorinated.

In the alternative, the membranes are characterized in terms of their selectivity before and after exposure to liquid hydrocarbons. Specifically, after exposure of the separation membrane to a liquid hydrocarbon, for example, toluene, and subsequent drying, the membranes have a post-exposure selectivity, for carbon dioxide over the desired gaseous hydrocarbon, that is at least about 60%, 65% or even 70% of a pre-exposure selectivity for carbon dioxide over the gaseous hydrocarbon, the pre- and post-exposure selectivities being measured with a test gas mixture of the same composition and under like conditions.

The selective layer is again made from an amorphous glassy polymer or copolymer with a fractional free volume no greater than about 0.3 and a glass transition temperature, Tg, of at least about 100° C. The polymer is fluorinated, generally heavily fluorinated, by which we mean having a fluorine:carbon ratio of atoms in the polymer of at least about 1:1. Preferably, the polymer is perfluorinated. In this case, however, the polymer need not incorporate a cyclic structure.

In a basic embodiment, the process of the invention includes the following steps:

(a) bringing a multicomponent gas mixture comprising carbon dioxide, a gaseous hydrocarbon, and a third gaseous component into contact with the feed side of a separation membrane having a feed side and a permeate side, the membrane having a selective layer comprising:

a polymer comprising repeating units having a fluorinated cyclic structure of an at least 5-member ring, the polymer having a fractional free volume no greater than about 0.3;

(b) providing a driving force for transmembrane permeation;

(c) withdrawing from the permeate side a permeate stream enriched in carbon dioxide compared to the gas mixture;

(d) withdrawing from the feed side a residue stream depleted in carbon dioxide compared to the gas mixture.

In the alternative, a basic embodiment of the process includes the following steps:

(a) bringing a multicomponent gas mixture comprising carbon dioxide, a gaseous hydrocarbon, and a third gaseous component into contact with the feed side of a separation membrane having a feed side and a permeate side, the membrane having a selective layer comprising a polymer having:

(i) a ratio of fluorine to carbon atoms in the polymer greater than 1:1;

(ii) a fractional free volume no greater than about 0.3; and (iii) a glass transition temperature of at least about 100° C.;

and the separation membrane being characterized by a post-exposure selectivity for carbon dioxide over the gaseous hydrocarbon, after exposure of the separation membrane to liquid toluene and subsequent drying, that is at least about 65% of a pre-exposure selectivity for carbon dioxide over the gaseous hydrocarbon, as measured pre- and post-exposure with a test gas mixture of the same composition and under like conditions;

(b) providing a driving force for transmembrane permeation;

(c) withdrawing from the permeate side a permeate stream enriched in carbon dioxide compared to the gas mixture;

(d) withdrawing from the feed side a residue stream depleted in carbon dioxide compared to the gas mixture.

Particularly preferred materials for the selective layer of the membrane used to carry out the process of the invention are amorphous homopolymers of perfluorinated dioxoles, dioxolanes or cyclic alkyl ethers, or copolymers of these with tetrafluoroethylene. Specific most preferred materials are copolymers having the structure:

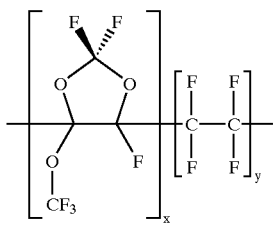

where x and y represent the relative proportions of the dioxole and the tetrafluoroethylene blocks, such that x+y=1.

A second highly preferred material has the structure:

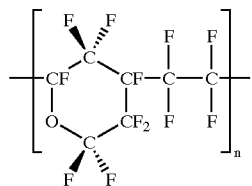

where n is a positive integer.

Contrary to what would be expected from the data presented in the Pinnau et al. *Journal of Membrane Science* paper, we have unexpectedly found that membranes formed from fluorinated cyclic polymers as characterized above can withstand exposure to $C_{3+}$ hydrocarbons well enough to provide useful separation capability for gas mixtures that include $C_{3+}$ hydrocarbon vapors. This resistance persists even when the $C_{3+}$ hydrocarbons are present at high levels, such as 5%, 10%, 15% or even more.

A particularly important advantage of the invention, therefore, is that the membranes can retain selectivity for carbon dioxide even in the presence of streams rich in, or even essentially saturated with, $C_{3+}$ hydrocarbon vapors. This distinguishes these membrane materials from all other membrane materials previously used commercially for such separations.

The membranes are also very resistant to plasticization by carbon dioxide, even at very high carbon dioxide partial pressures.

In addition, the membranes are resistant to contact with liquid hydrocarbons, in that they are able to retain their selectivity for carbon dioxide after prolonged exposure to liquid toluene, for example. This is a second beneficial characteristic that differentiates the processes of the invention from prior art processes. In the past, exposure of the membranes to liquid hydrocarbons frequently meant that the membranes were irreversibly damaged and had to be removed and replaced.

These unexpected and unusual attributes render the process of the invention useful in situations where it was formerly difficult or impractical for membrane separation to be used, or where membrane lifetimes were poor.

Because the preferred polymers are glassy and rigid, an unsupported film of the polymer may be usable in principle as a single-layer gas separation membrane. However, such a layer will normally be too thick to yield acceptable transmembrane flux, and in practice, the separation membrane usually comprises a very thin selective layer that forms part of a thicker structure, such as an asymmetric membrane or a composite membrane. The making of these types of membranes is well known in the art. If the membrane is a composite membrane, the support layer may optionally be made from a fluorinated polymer also, making the membrane a totally fluorinated structure and enhancing chemical resistance. The membrane may take any form, such as hollow fiber, which may be potted in cylindrical bundles, or flat sheets, which may be mounted in plate-and-frame modules or formed into spiral-wound modules.

The driving force for permeation across the membrane is the pressure difference between the feed and permeate sides, which can be generated in a variety of ways. The pressure difference may be provided by compressing the feedstream, drawing a vacuum on the permeate side, or a combination of both. The membrane is able to tolerate high feed pressures, such as above 200 psia, 300 psia, 400 psia or more.

As mentioned above, the membrane is able to operate satisfactorily in the presence of $C_{3+}$ hydrocarbons at high levels. Thus the partial pressure of the hydrocarbons in the feed may be close to saturation. For example, depending on the mix of hydrocarbons and the temperature of the gas, the aggregate partial pressure of all $C_{3+}$ hydrocarbons in the gas might be as much as 10 psia, 15 psia, 25 psia, 50 psia, 100 psia, 200 psia or more. Expressed as a percentage of the saturation vapor pressure at that temperature, the partial pressure of hydrocarbons, particularly $C_{3+}$ hydrocarbons, may be 20%, 30%, 50% or even 70% or more of saturation.

The carbon dioxide partial pressure may also be relatively high, such as 25 psia, 50 psia, 100 psia or above.

The process of the invention typically provides a selectivity, in mixtures containing multiple hydrocarbons including a $C_{3+}$ hydrocarbon vapor, for carbon dioxide over methane of at least about 5, even at high carbon dioxide activity. Frequently, the carbon dioxide/methane selectivity achieved is 10 or more, and may be as much as 15 or more, even in the presence of significant concentrations of $C_{3+}$ hydrocarbons.

The membrane separation process may be configured in many possible ways, and may include a single membrane unit or an array of two or more units in series or cascade arrangements. The processes of the invention also include combinations of the membrane separation process defined above with other separation processes, such as adsorption, absorption, distillation, condensation or other types of membrane separation.

The scope of the invention in this aspect is not intended to be limited to any particular gas streams, but to encompass any situation where a gas stream containing carbon dioxide and a gaseous hydrocarbon is to be separated. The composition of treatable gas streams varies widely, and the individual components may be present in any quantities. Thus, feed gas streams may contain just a few percent carbon dioxide, or 90% carbon dioxide or more. The gas may contain a single hydrocarbon component, such as methane, ethane or propane, or a mix of numerous hydrocarbons, such as $C_1$-$C_8$ hydrocarbons or heavier. The third component of the gas stream may be a second hydrocarbon, an inert gas, a second acid gas, water vapor or any other component.

It is envisaged that the process will be particularly useful as part of a natural gas processing train. Pipeline specification for natural gas is usually no more than about 2% carbon dioxide, but raw gas frequently contains more than 2% carbon dioxide and not infrequently contains 10% carbon dioxide or more. The process of the invention enables gas that is out of specification with respect to carbon dioxide to be brought to pipeline specification. Furthermore, since the membranes used are able to withstand other contaminants in the gas, the carbon dioxide removal steps may be performed upstream of other gas treatments, if required. This provides greater flexibility in plant design and operation than is often possible using prior art carbon dioxide separation methods.

It is an object of the present invention to provide a membrane-based process for separation of carbon dioxide from a gaseous hydrocarbon.

It is an object of the invention to provide a membrane-based process for treating out-of-specification natural gas.

Additional objects and advantages of the invention will be apparent from the description below to those of ordinary skill in the art.

It is to be understood that the above summary and the following detailed description are intended to explain and illustrate the invention without restricting its scope.

DETAILED DESCRIPTION OF THE INVENTION

Figure 1:
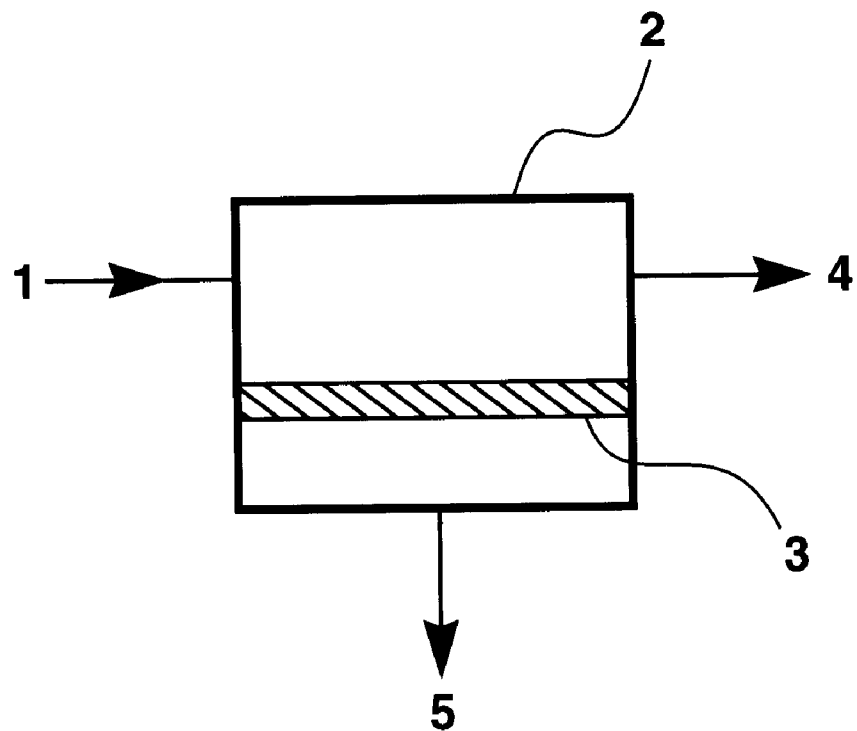
FIG. 1 is a schematic representation of the process of the invention in its most basic form.

The term gas as used herein means a gas or a vapor.

The terms hydrocarbon and organic vapor or organic compound are used interchangeably herein, and include, but are not limited to, saturated and unsaturated compounds of hydrogen and carbon atoms in straight chain, branched chain and cyclic configurations, including aromatic configurations, as well as compounds containing oxygen, nitrogen, halogen or other atoms.

The term $C_{2+}$ hydrocarbon means a hydrocarbon having at least two carbon atoms; the term $C_{3+}$ hydrocarbon means a hydrocarbon having at least three carbon atoms; and so on.

The term light hydrocarbon means a hydrocarbon molecule having no more than about six carbon atoms.

The term heavier hydrocarbon means a $C_{3+}$ hydrocarbon.

The term multicomponent gas mixture means a mixture containing at least carbon dioxide, a gaseous hydrocarbon and a third gaseous component. The components may be present in any proportions.

All percentages herein are by volume unless otherwise stated.

The invention is a process for separating carbon dioxide from a gaseous hydrocarbon component in a gas mixture, such as might be encountered during the processing of natural gas, for example. The separation is carried out by running a stream of the gas mixture across a membrane that is selective for carbon dioxide over hydrocarbons. The process results, therefore, in a permeate stream enriched in carbon dioxide and depleted in hydrocarbon, and a residue stream depleted in carbon dioxide and enriched in hydrocarbon.

The scope of the invention is not limited to any particular gas streams, but encompasses any situation where a multi-component gas stream containing carbon dioxide and a hydrocarbon gas is to be treated. The composition of the gas may vary widely, by way of example, from a mixture that contains a minor amount of carbon dioxide, such as a few percent, in admixture with various hydrocarbon components, to a mixture of mostly carbon dioxide and methane, to a mixture containing carbon dioxide as the major component, such as 70% or above, and including relatively heavy hydrocarbons, such as $C_5$–$C_8$ hydrocarbons or heavier, to a mixture of many different components, of which one is a hydrocarbon and one is carbon dioxide.

Besides carbon dioxide and the hydrocarbon from which the carbon dioxide is to be separated, the gas may contain any other components. Representative, but non-limiting examples of gases or vapors that may be found in the gas mixture to be treated include other acid gases, such as hydrogen sulfide; water vapor; inert gases, such as nitrogen, argon or helium; carbon monoxide; and $C_{2+}$ hydrocarbons, such as paraffins, olefins, aromatics, alcohols, halogenated compounds, and so on.

The feed gas mixture to be separated typically contains multiple hydrocarbon components in addition to carbon dioxide. The goal of the process may be to separate one, some or all of these components from the carbon dioxide.

As one non-limiting example, the gas mixture may be raw natural gas containing methane, ethane, $C_{3-8}$ hydrocarbons, hydrogen sulfide, water vapor, nitrogen and carbon dioxide. For natural gas to be accepted into the pipeline, it must normally contain no more than about 2% carbon dioxide. The goal of the process may then be to reduce the carbon dioxide content of the raw gas to 2% or below. The process might then provide a permeate enriched in carbon dioxide and nitrogen and a product residue stream enriched in all hydrocarbons compared with the raw gas. Alternatively, the same feed may be processed to provide a permeate from which more carbon dioxide and nitrogen has been removed, to meet a total inerts specification of below 4%, so that the permeate is also enriched in methane compared with the feed, and the product is a residue stream enriched in $C_{2+}$ hydrocarbons but slightly depleted in methane compared with the feed.

As a second non-limiting example, the feed gas stream may arise as a result of oil extraction by miscible flood operations. In these operations, carbon dioxide is injected into the ground at the periphery of an oil reservoir. The gas dissolves in the oil left in the pore space of the formation and lowers its viscosity. The resulting mixture is then pushed by water or gas pressure to the extraction wells. Initially the associated gas extracted with the oil is rich in methane, but over time the methane concentration falls and the carbon dioxide concentration rises, to as much as 80 or 90%. The mixture extracted from the wells is separated into recovered oil, produced water, carbon dioxide for reinjection, and condensed hydrocarbon liquids (NGL). Separation of the carbon dioxide from the methane and other hydrocarbons in the associated gas is important for the process to be economically sound.

In this case, the raw gas stream may contain large amounts of carbon dioxide, a mix of relatively heavy $C_{3+}$ hydrocarbons and only small amounts of methane. The process might then provide a permeate comprising mostly carbon dioxide of a quality suitable for reinjection, and a residue stream of mixed hydrocarbons, to be used as fuel gas or subjected to additional processing, such as cooling and phase separation, for example, for recovery of NGL and/or pipeline grade gas.

As a third non-limiting example, the feed stream may be a gas stream from a petrochemical manufacturing process, comprising a petrochemical feedstock, such as ethylene, as well as carbon dioxide and inert gases. Such gas streams are commonly encountered in oxidation processes using a light olefin feed: from oxo reactors or the like, making ethylene or propylene derivatives such as acetaldehyde or isopropanol; and during polyolefin manufacture, such as LDPE (low density polyethylene) manufacture. The carbon dioxide may be introduced with the feedstock or may be formed as a reaction by-product, and may build up in the reactor when off-gas is recycled, thereby adversely affecting the reactor throughput or changing reaction conditions.

The process of the invention may be used to purge carbon dioxide from the reactor loop. The gas might then be treated to produce a predominantly carbon dioxide-enriched permeate stream as a waste stream and to minimize ethylene or propylene losses. Alternatively, the same feed may be processed to purge most of the carbon dioxide and at least a portion of the inert gases with modest losses of feedstock. The ethylene- or propylene-rich residue stream might then be recirculated within the process for additional ethylene conversion.

In other words, the cut between carbon dioxide and hydrocarbons may be made to achieve as much separation from any specific hydrocarbon as is desired, subject of course to the relative permeabilities of the hydrocarbons in the mix.

The process of the invention in its most basic form is shown in FIG. 1. Referring to this figure, a feedstream, 1, comprising a gas mixture including carbon dioxide and at least one organic compound, is passed into membrane separation unit 2 and flows across the feed side of membrane 3. The membrane is characterized by having a selective layer comprising a polymer containing repeat units having a fluorinated cyclic structure of an at least 5-member ring, the polymer having a fractional free volume no greater than about 0.3. Under a pressure difference between the feed and permeate sides of the membrane, carbon dioxide passes preferentially to the permeate side, and carbon-dioxide-enriched stream, 5, is withdrawn from the permeate side. The remaining carbon-dioxide-depleted, organic-compound-enriched residue stream, 4, is withdrawn from the feed side. The permeate stream or the residue stream, or both, may be the useful products of the process.

The process differs from processes previously available in the art in that:

(i) the membranes are able to maintain useful separation properties in the presence of organic vapors, such as $C_{3+}$ hydrocarbons, even at high levels in the gas, (ii) the membranes are able to withstand high partial pressures of carbon dioxide, and (iii) the membranes can recover from accidental exposure to liquid organic compounds.

The process of the invention typically provides a selectivity, in mixtures containing multiple hydrocarbons including a $C_{3+}$ hydrocarbon, for carbon dioxide over methane of at least about 5, even at high carbon dioxide activity. Frequently, the carbon dioxide/methane selectivity achieved is 10 or more, and may be as much as 15 or more, even in the presence of significant concentrations of $C_{2+}$ hydrocarbons.

To provide these attributes, the process differs from previous gas/organic vapor separation processes in the nature of the membrane, 3, that is used. The membranes used in the process of the invention are made from a glassy polymer, characterized by having repeating units of a fluorinated, cyclic structure, the ring having at least five members. The polymer is further characterized by a fractional free volume no greater than about 0.3 and preferably by a glass transition temperature, Tg, of at least about 100° C. Preferably, the polymer is perfluorinated.

In the alternative, the membranes are characterized in terms of their selectivity before and after exposure to liquid hydrocarbons. Specifically, the membranes have a post-exposure selectivity for carbon dioxide over the gaseous hydrocarbon from which it is to be separated, after exposure of the separation membrane to a liquid hydrocarbon, for example, toluene, and subsequent drying, that is at least about 60%, 65% or even 70% of a pre-exposure selectivity for carbon dioxide over the gaseous hydrocarbon, the pre- and post-exposure selectivities being measured with a test gas mixture of the same composition and under like conditions.

In applying this test to determine whether the membrane is suitable for use in the process of the invention, it is important to test the membrane itself, and not just a film of the selective layer polymer. A thick film, for example 50 μm or more thick, of the selective layer polymer may appear to resist dissolution and swelling and maintain selectivity, even when soaked for days in liquid hydrocarbon. However, when used in an asymmetric or composite membrane with a selective layer thin enough to provide useful transmembrane flux for the desired gas (which may mean a selective layer as thin as 10 μm, 5 μm, 1 μm or less), the same material may disintegrate within minutes of contact with the hydrocarbon liquid.

It is also important that the test gas mixtures used to measure the selectivity before and after exposure have essentially the same composition, and that the test be carried out under essentially the same conditions of pressure, temperature, gas flow and membrane area, since all of these parameters may have an effect on selectivity. The test gas mixture should obviously contain carbon dioxide and the gaseous hydrocarbon, for example, methane, propane, ethylene or propylene, from which it is desired to separate hydrogen, but need not be identical in composition to the feed gas mixture to the process, since this may change from time to time in any case.

It is preferred that the hydrocarbon liquid to which the membrane is exposed in the test is an aromatic liquid, such as toluene, rather than a paraffin, for example, since this provides more aggressive test conditions. The test can be carried out in any convenient manner. A simple and preferred protocol is to measure the membrane selectivity using a bench-top test cell apparatus such as is familiar to those of skill in the art, remove the membrane stamp from the test cell, immerse it in liquid toluene for a period, remove it, dry it in air and retest it as before. For an adequate test, the period of immersion should be representative of the exposure that might occur during a system upset when the membrane is in use, such as one or two hours, or overnight (about eight hours).

In this case the polymer need not incorporate a cyclic structure. The selective layer is again made from an amorphous glassy polymer or copolymer with a fractional free volume no greater than about 0.3 and a glass transition temperature, Tg, of at least about 100° C. The polymer is fluorinated, generally heavily fluorinated, by which we mean having a fluorine:carbon ratio of atoms in the polymer of at least about 1:1. Preferably, the polymer is perfluorinated, even if the perfluorinated structure has a less than 1:1 fluorine:carbon ratio.

The preferred cyclic or non-cyclic polymers are not new materials in themselves. In fact, general polymer formulations embracing those suitable for use in the invention are described in patents dating back from the present day to the 1960s, for example, U.S. Pat. Nos. 3,308,107; 3,488,335; 3,865,845; 4,399,264; 4,431,786; 4,565,855; 4,594,399; 4,754,009; 4,897,457; 4,910,276; 5,021,602; 5,117,272; 5,268,411; 5,498,682; 5,510,406; 5,710,345; 5,883,177; 5,962,612; and 6,040,419.

The ring structure within the repeat units may be aromatic or non-aromatic, and may contain other atoms than carbon, such as oxygen atoms. Preferred polymers for the selective layer of the membrane are formed from fluorinated monomers of (i) dioxoles, which are five-member rings of the form

that polymerize by opening of the double bond, or (ii) dioxolanes, similar five-member rings but without the double bond in the main ring, or (iii) aliphatic structures having an alkyl ether group, polymerizable into cyclic ether repeat units with five or six members in the ring.

Not all polymers within the above structural definitions and preferences are suitable for use as membrane selective layers in the invention. For example, certain of the polymers and copolymers of perfluoro-2,2-dimethyl-1,3-dioxole reported in U.S. Pat. No. 5,051,114 have been shown to be susceptible to plasticization to the point of switching from being selective for nitrogen over hydrocarbons to being selective for hydrocarbons over nitrogen as the hydrocarbon partial pressure increases.

These polymers are, however, characterized by very high fractional free volume within the polymer, typically above 0.3. For example, a paper by A. Yu. Alentiev et al, "High transport parameters and free volume of perfluorodioxole copolymers", *Journal of Membrane Science*, Vol. 126, pages 123–132 (1997) reports fractional free volumes of 0.32 and 0.37 for two grades of perfluoro-2,2-dimethyl-1,3-dioxole copolymers (Table 1, page 125).

Likewise, these polymers are of low density compared with other polymers, such as below about 1.8 g/cm³ and are unusually gas permeable, for instance exhibiting pure gas permeabilities as high as 1,000 Barrer or more for oxygen and as high as 2,000 Barrer or more for hydrogen.

It is believed that polymers with denser chain packing, and thus lower fractional free volume, higher density and lower permeability, are more resistant to plasticization. Hence, the polymers used in the invention to form the selective, discriminating layer of the membrane should preferably be limited, in addition to the specific structural limitations defined and discussed above, to those having a fractional free volume less than about 0.3.

In referring to fractional free volume (FFV), we mean the free volume per unit volume of the polymer, defined and calculated as:

$$FFV = SFV/v_{sp}$$

where SFV is the specific free volume, calculated as:

$$SFV = v_{sp} - v_0 = v_{sp} - 1.3 v_w$$

and where:

$v_{sp}$ is the specific volume (cm³/g) of the polymer determined from density or thermal expansion measurements, $v_0$ is the zero point volume at 0° K., and $v_w$ is the van der Waals volume calculated using the group contribution method of Bondi, as described in D. W. van Krevelan, *Properties of Polymers*, 3$^{rd}$ Edition, Elsevier, Amsterdam, 1990, pages 71–76.

Expressed in terms of density, the selective layer polymers should preferably have a density above about 1.8 g/cm³. Expressed in terms of permeability, the selective layer polymers will generally exhibit an oxygen permeability no higher than about 300 Barrer, more typically no higher than about 100 Barrer, and a hydrogen permeability no higher than about 1,000 Barrer, more typically no higher than about 500 Barrer.

Since the polymers used for the selective layer need to remain rigid and glassy during operation, they should also have glass transition temperatures comfortably above temperatures to which they are typically exposed during the process. Polymers with glass transition temperature above about 100° C. are preferred, and, subject also to the other requirements and preferences above, the higher the glass transition temperature, in other words, the more rigid the polymer, the more preferred it is.

The polymers should preferably take amorphous, rather than crystalline form, because crystalline polymers are typically essentially insoluble and thus render membrane making difficult, as well as exhibiting low gas permeability.

As stated above, the polymers are fluorinated. More preferably, they have a fluorine:carbon ratio of atoms in the polymer of at least about 1:1, and most preferably, they are perfluorinated.

The polymers may be homopolymers of the repeating units of fluorinated cyclic structures defined above. Optionally, they may be copolymers of such repeat units with other polymerizable repeat units. For preference, these other repeat units should be at least partially fluorinated, and most preferably heavily fluorinated or perfluorinated. A number of suitable materials are known, for example, fluorinated ethers, ethylene and propylene. Particularly when perfluorinated, homopolymers made from these materials, such as polytetrafluoroethylene (PTFE) and the like, are very resistant to plasticization. However, they tend to be crystalline or semi-crystalline and to have gas permeabilities too low for any useful separation application. As constituents of copolymers with the fluorinated ring structures defined above, however, they can produce materials that combine amorphous structure, good permeability and good resistance to plasticization. Copolymers that include tetrafluoroethylene units are particularly preferred. Other specific examples of copolymers that are suitable are polyhexafluoropropylene and chlorofluoro ethylenes and propylenes.

Specific most preferred materials are copolymers of tetrafluoroethylene with 2,2,4-trifluoro-5-trifluoromethoxy-1,3-dioxole having the structure:

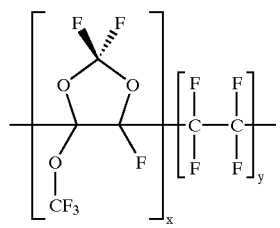

where x and y represent the relative proportions of the dioxole and the tetrafluoroethylene blocks, such that x+y=1.

Such materials are available commercially from Ausimont S.p.A., of Milan, Italy under the trade name Hyflon® AD. Different grades are available varying in proportions of the dioxole and tetrafluoroethylene units, with fluorine:carbon ratios of between 1.5 and 2, depending on the mix of repeat units. For example, grade Hyflon AD60 contains a 60:40 ratio of dioxole to tetrafluoroethylene units, has a fractional free volume of 0.23, a density of 1.93 g/cm$^3$ and a glass transition temperature of 121° C., and grade Hyflon AD80 contains an 80:20 ratio of dioxole to tetrafluoroethylene units, has a fractional free volume of 0.23, a density of 1.92 g/cm$^3$ and a glass transition temperature of 134° C.

A second highly preferred group of materials is the set of polyperfluoro (alkenyl vinyl ethers) including polyperfluoro (allyl vinyl ether) and polyperfluoro (butenyl vinyl ether). A specific most preferred material of this type has the structure:

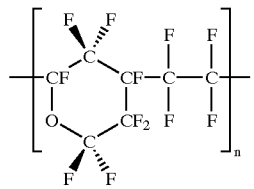

where n is a positive integer.

This material is available commercially from Asahi Glass Company, of Tokyo, Japan under the trade name Cytop®. Cytop has a fractional free volume of 0.21, a density of 2.03 g/cm$^3$, a glass transition temperature of 108° C., and a fluorine:carbon ratio of 1.7.

A third group of materials that is believed to contain useful selective layer materials is perfluorinated polyimides. Such materials have been investigated for use as optical waveguides, and their preparation is described, for example, in S. Ando et al., "Perfluorinated polymers for optical waveguides", CHEMTECH, December, 1994. To be usable as membrane materials, the polyimides have to be capable of being formed into continuous films. Thus, polyimides that incorporate ether or other linkages that give some flexibility to the molecular structure are preferred.

Particular examples are polymers comprising repeat units prepared from the perfluorinated dianhydride 1,4-bis(3,4-dicarboxytrifluorophenoxy) tetrafluorobenzene (10FEDA), which has the structure:

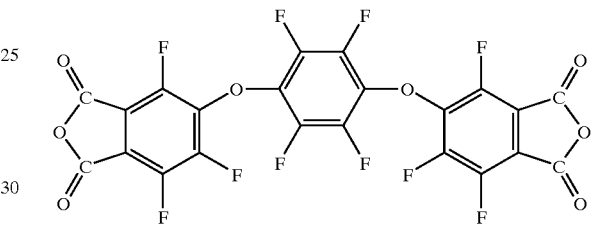

Diamines with which 10FEDA can be reacted to form polyamic acids and hence polyimides include 4FMPD, which has the structure:

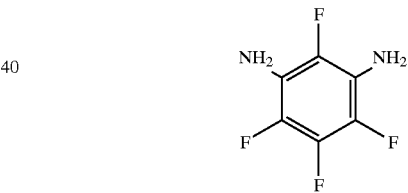

The resulting 10FEDA/4FMPD polyimide has the repeat unit structure:

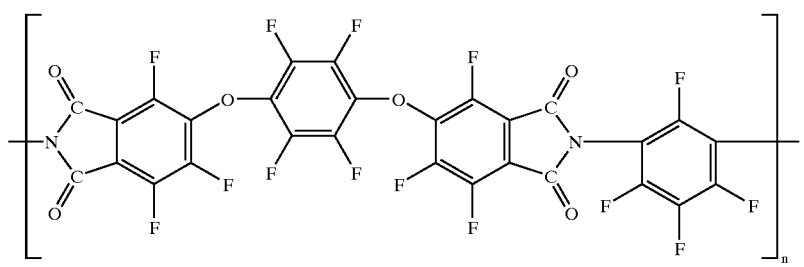

where n is a positive integer.

Yet further discussion of membrane materials is included in copending application Ser. No. 09/574,303, now U.S. Pat. No. 6,361,582, entitled "Gas Separation Using $C_{3+}$ Hydrocarbon Resistant Membranes" incorporated herein by reference in its entirety.

The polymer chosen for the selective layer can be used to form films or membranes by any convenient technique known in the art, and may take diverse forms. Because the polymers are glassy and rigid, an unsupported film, tube or fiber of the polymer may be usable in principle as a single-layer membrane. In this case, our preferred method of manufacture is to prepare a solution of the polymer in a perfluorinated solvent and to cast the solution onto a glass plate or a removable or non-removable backing web, according to general casting procedures that are well known in the art. The resulting flat-sheet membrane films may be dried under ambient conditions, at elevated temperature, or under vacuum as desired to produce thin film membranes.

Alternatively, the membrane may be manufactured in the form of hollow fibers, the general methods for preparation of which are copiously described in the literature, for example in U.S. Pat. No. 3,798,185 to Skiens et al., incorporated herein by reference.

However, such single-layer films will normally be too thick to yield acceptable transmembrane flux, and in practice, the separation membrane usually comprises a very thin selective layer that forms part of a thicker structure, such as an integral asymmetric membrane, comprising a dense region that forms the separation membrane and a microporous support region. Such membranes were originally developed by Loeb and Sourirajan, and their preparation in flat sheet or hollow fiber form is now conventional in the art and is described, for example, in U.S. Pat. Nos. 3,133,132 to Loeb, and 4,230,463 to Henis and Tripodi.

As a further, and a preferred, alternative, the membrane may be a composite membrane, that is, a membrane having multiple layers. Modern composite membranes typically comprise a highly permeable but relatively non-selective support membrane, which provides mechanical strength, coated with a thin selective layer of another material that is primarily responsible for the separation properties. Typically, but not necessarily, such a composite membrane is made by solution-casting the support membrane, then solution-coating the selective layer.

General preparation techniques for making composite membranes of this type are well known, and are described, for example, in U.S. Pat. No. 4,243,701 to Riley et al., incorporated herein by reference. If the membrane is made in the form of a composite membrane, it is particularly preferred to use a fluorinated or perfluorinated polymer, such as polyvinylidene fluoride, to make the microporous support membrane. Again, the membrane may take flat-sheet, tube or hollow-fiber form. The most preferred support membranes are those with an asymmetric structure, which provides a smooth, comparatively dense surface on which to coat the selective layer. Support membranes are themselves frequently cast onto a backing web of paper or fabric. As an alternative to coating onto a support membrane, it is also possible to make a composite membrane by solution-casting the polymer directly onto a non-removable backing web, as mentioned above.

In hollow-fiber form, multilayer composite membranes may be made by a coating procedure as taught, for example, in U.S. Pat. Nos. 4,863,761; 5,242,636; and 5,156,888, or by using a double-capillary spinneret of the type taught in U.S. Pat. Nos. 5,141,642 and 5,318,417.

The membrane may also include additional layers, such as a gutter layer between the microporous support membrane and the selective layer, or a sealing layer on top of the selective layer. A gutter layer generally has two purposes.

The first is to coat the support with a material that seals small defects in the support surface, and itself provides a smooth, essentially defect-free surface onto which the selective layer may be coated. The second is to provide a layer of highly permeable material that can channel permeating molecules to the relatively widely spaced pores in the support layer.

Preferred materials for the gutter layer are fluorinated or perfluorinated, to maintain high chemical resistance through the membrane structure, and of very high permeability. Particularly preferred for the gutter layer, although they are unsuitable for the selective layer, are the perfluorinated dioxole polymers and copolymers of U.S. Pat. No. 5,051,114 referred to above, having fractional free volume greater than 0.3 and extraordinarily high permeability, such as copolymers of perfluoro-2,2-dimethyl-1,3-dioxole and tetrafluoroethylene, available commercially as Teflon® AF from DuPont Fluoroproducts of Wilmington, Del. Such materials, or any others of good chemical resistance that provide protection for the selective layer without contributing significant resistance to gas transport, are also suitable as sealing layers.

Multiple selective layers may also be used.

The thickness of the selective layer or skin of the membranes can be chosen according to the proposed use, but will generally be no thicker than 10 $\mu$m, and typically no thicker than 5 $\mu$m. It is preferred that the selective layer be sufficiently thin that the membrane provide a pressure-normalized carbon dioxide flux, as measured with pure carbon dioxide at 25° C., of at least about 50 GPU (where 1 GPU=1×10$^{-6}$ cm$^3$(STP)/cm$^2$·s·cmHg), more preferably at least about 100 GPU and most preferably at least about 200 GPU. In general, the membranes of the invention provide transmembrane gas fluxes that are high compared with membranes using conventional carbon dioxide-separating materials, such as polyimides, cellulose acetate and polysulfone.

Once formed, the membranes exhibit a combination of good mechanical properties, thermal stability, and high chemical resistance. The fluorocarbon polymers that form the selective layer are typically insoluble except in perfluorinated solvents and are resistant to acids, alkalis, oils, low-molecular-weight esters, ethers and ketones, aliphatic and aromatic hydrocarbons, and oxidizing agents, making them suitable for use not only in the presence of $C_{3+}$ hydrocarbons, but in many other hostile environments.

The membranes of the invention may be prepared in any known membrane form and housed in any convenient type of housing and separation unit. We prefer to prepare the membranes in flat-sheet form and to house them in spiral-wound modules. However, flat-sheet membranes may also be mounted in plate-and-frame modules or in any other way. If the membranes are prepared in the form of hollow fibers or tubes, they may be potted in cylindrical housings or otherwise.

The membrane separation unit, 2, comprises one or more membrane modules. The number of membrane modules required will vary according to the volume of gas to be treated, the composition of the feed gas, the desired compositions of the permeate and residue streams, the operating pressure of the system, and the available membrane area per module. Systems may contain as few as one membrane module or as many as several hundred or more. The modules may be housed individually in pressure vessels or multiple elements may be mounted together in a sealed housing of appropriate diameter and length.

The composition and pressure at which the feed stream, 1, is supplied to the membrane modules varies depending on the source of the stream. If the feed gas stream to be treated is at high pressure compared with atmospheric, such as 200 psia, 400 psia, 500 psia or above, the separation may be effected simply by making use of this high pressure to provide an adequate driving force and feed:permeate pressure ratio. Otherwise, a pressure difference can be provided by compressing the feed stream, by drawing a vacuum on the permeate side of the membrane, or a combination of both. Polymer membranes can typically withstand pressure differences between the feed and permeate side up to about 1,500–2000 psi, so it might occasionally be necessary to let down the gas pressure before it can be fed to the membrane system.

An important consideration is the effect of hydrocarbons, particularly $C_{3+}$ hydrocarbons, in the feed stream. Unlike prior art membranes, the membranes of the invention can maintain useful gas/hydrocarbon separation performance, in terms of transmembrane gas flux and selectivity, when exposed to high concentrations of such organics, even when the gas mixture is close to saturation with these compounds. This is true with respect to a broad range of hydrocarbons, including paraffins, olefins, aromatics, such as benzene, toluene and xylenes (BTEX), alcohols and chlorinated compounds. These properties are different from those reported in the literature for dioxole membranes, as well as obtained with prior art conventional membrane materials, such as cellulose acetate, polysulfone, or polyimides that are not perfluorinated.

Even if condensation of organic liquid does accidentally occur from time to time, the membrane unit can generally be purged with, for example, an inert gas such as nitrogen, and the membranes will frequently continue thereafter to exhibit adequate carbon dioxide/hydrocarbon selectivity properties.

In contrast, prior art membranes in commercial use are generally plasticized and irreversibly damaged by exposure to $C_{3+}$ hydrocarbon vapors at any significant concentration, such as more than about 10%, 20% or 25%, or at more modest concentrations, such as less than 10%, for prolonged periods, and cannot withstand even fleeting exposure to condensed hydrocarbon liquids.

The ability of the membranes to withstand exposure to organic compounds means that the membrane modules may be cleaned with organic solvents. This is a very useful property. Industrial gas streams often contain small amounts of entrained oils and other relatively heavy organic components, which may enter the separation system and become trapped in the modules, fouling the membrane surface. Even if the membranes themselves are not damaged, the performance may be adversely affected by the build-up of such materials. One attractive feature of the present invention is that the modules can be cleaned periodically or as required by flushing with organic solvents to remove such contaminants.

As a rough general guide, expressed as a concentration, the feed gas treated by the process of the invention may have a hydrocarbons content, including $C_{3+}$ hydrocarbon vapors, of at least about 5%, 10%, 15%, 20% or higher. Expressed in terms of partial pressure, the feed stream may often be acceptable with a partial pressure of $C_{3+}$ hydrocarbons of as high as 15 psia, 25 psia, 50 psia, 100 psia or more, assuming a gas temperature of ambient or above; and the residue stream partial pressure of the $C_{3+}$ hydrocarbons together can often be as high as 50 psia, 100 psia, 150 psia or 200 psia, again assuming a temperature of ambient or above. Expressed as the ratio of the feed pressure, P, to the saturation vapor pressure, $P_{sat}$, of the gas mixture, which is an approximate measure of the activity of the gas, the feed gas may be supplied to the membrane separation step at pressure and temperature conditions that result in the percentage $P/P_{sat}$ being at least about 25%, 30%, 50%, 60%, 70% or higher.

Methane and $C_2$ components, which tend to have low boiling points, and to be less condensable and less harmful in terms of their plasticizing ability, can generally be present in any concentration.

As mentioned above, the membranes are also very resistant to plasticization by carbon dioxide, even at very high carbon dioxide partial pressures. Thus, the feed stream partial pressure of carbon dioxide can be as high as 50 psia, 100 psia, 150 psia, 200 psia or above.

Depending on the performance characteristics of the membrane, and the operating parameters of the system, the process can be designed for varying levels of gas purification and recovery. Single-stage gas-separation processes typically remove up to about 80–95% of the preferentially permeating component from the feed stream and produce a permeate stream significantly more concentrated in that component than the feed gas. This degree of separation is adequate for many applications. If the residue stream requires further purification, it may be passed to a second bank of modules for a second processing step. If the permeate stream requires further concentration, it may be passed to a second bank of modules for a second-stage treatment. Such multistage or multistep processes, and variants thereof, will be familiar to those of skill in the art, who will appreciate that the process may be configured in many possible ways, including single-stage, multistage, multistep, or more complicated arrays of two or more units in series or cascade arrangements.

Optionally, the processes of the invention already discussed may include other separation steps used in conjunction with the defined membrane separation process. Examples of such separation steps include adsorption, absorption, other types of membrane separation, condensation, and distillation. The other separation steps may be carried out upstream, downstream or both of the membrane separation step, that is, with reference to FIG. 1 on any of streams 1, 4 and 5. As non-limiting examples, streams may be filtered to separate out entrained oil or water droplets, passed through a glycol absorption unit for dehydration, subjected to amine scrubbing to remove hydrogen sulfide, or cooled to condense out high boiling components.

As just one more specific illustration, processes that include the membrane separation step combined with a pressure swing adsorption (PSA) step are within the scope of the invention. Details of the operation of PSA units are well documented in the art, and do not require lengthy description here. It is also well known to combine PSA with membrane separation, as is disclosed, for example, in U.S. Pat. No. 6,011,192.

The invention is now illustrated in further detail by specific examples. These examples are intended to further clarify the invention, and are not intended to limit the scope in any way.

EXAMPLES

Example 1

Membrane Making and Testing

Asymmetric, microporous poly(vinylidene fluoride) [PVDF] support membranes were prepared. Composite membranes were prepared using the following coating solutions:

1 wt % copolymer solution of 40% tetrafluoroethylene/ 60% 2,2,4-trifluoro-5-trifluoromethoxy-1,3-dioxole (Hyflon® AD60), (Ausimont, Italy), in aperfluorinated solvent (Fluorinert FC-84), (3M, St. Paul, Minn.).

1 wt % copolymer solution of 20% tetrafluoroethylene/ 80% 2,2,4-trifluoro-5-trifluoromethoxy-1,3-dioxole (Hyflon® AD80), (Ausimont, Italy), in FC-84 solvent.

1 wt % polyperfluoro (alkenyl vinyl ether) (Cytop®), (Asahi Glass, Japan), in FC-84 solvent.

The support membranes were dip-coated in a solution of one of the three selective polymer solutions at 1 ft/min coating speed, then dried in an oven at 60° C. for 10 minutes. The resulting membranes had a selective layer thickness ranging from 0.2–0.5 µm.

Samples of each finished composite membrane were cut into 12.6 cm² stamps and tested in a permeation test-cell apparatus with pure gases at 35° C. feed temperature and 65 psia feed pressure. During each test, the feed, permeate, and residue compositions were analyzed by gas chromatography (GC).

The gas fluxes of the membranes were measured, and the selectivities were calculated. Table 1 summarizes the fluxes and Table 2 summarizes the selectivities of the composite membranes, calculated as the ratio of the pure gas fluxes.

TABLE 1

| | Pure-Gas Pressure-Normalized Flux (GPU) | | |
|---|---|---|---|
| Gas | Hyflon ® AD60 | Hyflon ® AD80 | Cytop ® |
| Nitrogen | 52 | 184 | 34 |
| Oxygen | 180 | 574 | 130 |
| Helium | 1,360 | 1,850 | 1,270 |
| Hydrogen | 790 | 2,040 | 620 |
| Argon | 85.4 | 289 | 56 |
| Carbon Dioxide | 433 | — | 300 |
| Methane | 17.6 | 65.8 | 11 |
| Ethane | 4.5 | 18.8 | 3 |
| Ethylene | 9.8 | 35.9 | 5.7 |
| Propane | 1.1 | — | 3.4 |
| Propylene | 5.1 | 25.6 | — |
| $CF_4$ | 0.94 | 3.38 | 0.48 |
| $NF_3$ | 10.3 | 38.8 | 5.7 |

1 GPU = 1 × 10⁻⁶ cm³(STP)/cm² · s · cmHg

TABLE 2

| | Selectivity (–) | | |
|---|---|---|---|
| Gas Pair | Hyflon ® AD60 | Hyflon ® AD80 | Cytop ® |
| $N_2/CF_4$ | 55 | 58 | 71 |
| $O_2/N_2$ | 3.5 | 3.1 | 3.8 |
| $N_2/CH_4$ | 2.9 | 2.8 | 3.2 |
| $He/H_2$ | 1.7 | 0.91 | 2.0 |
| $Ar/CH_4$ | 4.8 | 4.4 | 5.3 |
| $Ar/C_2H_4$ | 8.7 | 8.0 | 9.7 |
| $CO_2/CH_4$ | 26 | — | 28 |
| $H_2/CH_4$ | 45 | 31 | 59 |
| $N_2/C_2H_4$ | 5.3 | 5.1 | 6.0 |
| $N_2/C_2H_6$ | 10 | 7.2 | — |

Example 2

Mixed-Gas Carbon Dioxide/Methane Permeation Properties

Membranes were prepared and membrane stamps were subjected to permeation experiments using the same general procedure as in Example 1. The temperature was 22° C., the feed pressure was 115 psia, and the feed gas mixture contained 65% carbon dioxide, 25% methane and 10% propane. The pressure-normalized fluxes of carbon dioxide and methane were measured, and the carbon dioxide/methane selectivities were calculated. The results are shown in Table 3.

TABLE 3

| | Mixed-Gas Pressure-Normalized Flux (GPU) | | $CO_2/CH_4$ |
|---|---|---|---|
| Membrane | $CO_2$ | $CH_4$ | Selectivity (–) |
| Hyflon ® AD60 | 460 | 27 | 17 |
| Hyflon ® AD80 | 1,620 | 125 | 13 |
| Cytop ® | 128 | 5.8 | 22 |

Example 3

Binary-Mixed-Gas Carbon Dioxide/Methane Permeation Properties

A Hyflon® AD60 membrane was prepared and subjected to permeation experiments using the same general procedure as in Example 1. The temperatures ranged from –20 to 20° C., the feed pressures ranged from 115 to 415 psia, and the feed gas mixture contained 70% carbon dioxide and 30% methane. The pressure-normalized fluxes of carbon dioxide and methane were measured, and the carbon dioxide/methane selectivities were calculated. The results are shown in Table 4.

TABLE 4

| Temperature | Pressure | Mixed-Gas Pressure-Normalized Flux (GPU) | | $CO_2/CH_4$ |
|---|---|---|---|---|
| (° C.) | (psia) | $CO_2$ | $CH_4$ | Selectivity (–) |
| 20 | 115 | 89 | 5.2 | 17 |
| –20 | 115 | 92 | 2.6 | 36 |
| –20 | 215 | 113 | 3.8 | 29 |
| –20 | 315 | 279 | 13 | 21 |
| –20 | 415 | 1,420 | 167 | 8.5 |

As can be seen from the table, the membranes retained useful carbon dioxide/methane selectivities over the test range. At –20° C., the saturation vapor pressure of carbon dioxide is 285 psia. Under the extreme conditions of low temperature (–20° C.) combined with high pressure (415 psia) of the test, carbon dioxide partial pressure reached 290 psia, i.e., saturation. Even when the gas mixture was saturated with carbon dioxide, the membranes withstood plasticization by carbon dioxide well enough to retain the carbon dioxide/methane selectivity at a usable level.

Example 4

Solvent Resistance of Hyflon® AD60 Compared to Polysulfone

Experiments were carried out to determine the stability of a Hyflon® AD60 membrane in the presence of hydrocarbon solvents. Samples of a Hyflon® AD60 membrane were tested in a permeation test-cell as in Example 1. The fluxes were measured and the selectivities calculated. The membrane stamps were then immersed in liquid toluene or hexane. After one week, the membranes were removed from the hydrocarbon liquid, dried at ambient temperature, and retested in the gas permeation test-cell. A polysulfone (PSF) asymmetric membrane was also tested for comparison. The permeation properties of the Hyflon® AD60 and polysulfone membranes before and after exposure to the hydrocarbon solvent are summarized in Table 5.

TABLE 5

| Membrane | Initial Flux (GPU) | | Initial Selectivity (-) | | Post-Toluene Flux (GPU) | | Post-Toluene Selectivity (-) | |
|---|---|---|---|---|---|---|---|---|
| | $N_2$ | $H_2$ | $O_2/N_2$ | $H_2/CH_4$ | $N_2$ | $H_2$ | $O_2/N_2$ | $H_2/CH_4$ |
| Hyflon® | 30 | 350 | 3.1 | 25 | 41 | 477 | 3.1 | 26 |
| PSF | 1.2 | — | 5.6 | — | Dissolved | | | |

| Membrane | Initial Flux (GPU) | | Initial Selectivity (-) | | Post-Hexane Flux (GPU) | | Post-Hexane Selectivity (-) | |
|---|---|---|---|---|---|---|---|---|
| | $N_2$ | $H_2$ | $O_2/N_2$ | $H_2/CH_4$ | $N_2$ | $H_2$ | $O_2/N_2$ | $H_2/CH_4$ |
| Hyflon® | 31 | 350 | 3.0 | 24 | 41 | 480 | 3.1 | 27 |
| PSF | 0.6 | 50 | 6.8 | 99 | 1.6 | 87 | 5.9 | 48 |

As can be seen, the polysulfone membranes could not withstand exposure to toluene, and their hydrogen/methane selectivity declined by half after exposure to hexane. In contrast, the dioxole copolymer Hyflon® membranes, although they exhibited higher fluxes for all gases for which they were tested after soaking in liquid hydrocarbons, retained their hydrogen/methane selectivity.

Examples 5–6

Comparative Examples with Teflon® AF 2400 Composite Membranes—not in Accordance with the Invention Example 5

Membrane Making and Testing

Asymmetric, microporous poly(vinylidene fluoride) [PVDF] support membranes were prepared. Composite membranes were prepared by dip-coating the support membranes three times in a solution of 1 wt % 2,2-bistrifluoromethyl-4,5-difluoro-1,3-dioxole/tetrafluoroethylene copolymer [Teflon® AF2400] solution in FC-84 solvent at 1 ft/min coating speed, then dried in an oven at 60° C. for 10 minutes. The resulting membranes had a selective layer thickness of 4 μm.

Samples of each finished composite membrane were cut into 12.6 cm² stamps and tested in a permeation test-cell apparatus with pure oxygen and nitrogen at 22° C. feed temperature and 65 psia feed pressure. During each test, the feed, permeate, and residue compositions were analyzed by gas chromatography (GC).

The gas fluxes were measured, and the selectivities were calculated. Table 6 summarizes the pressure-normalized fluxes and selectivities of the composite Teflon® AF membranes.

TABLE 6

| Mixed-Gas Pressure-Normalized Flux (GPU) | | Selectivity (-) |
|---|---|---|
| $N_2$ | $O_2$ | $O_2/N_2$ |
| 185 | 353 | 1.9 |

Example 6

Mixed-Gas Carbon Dioxide/Methane Permeation Properties

Membranes were prepared and subjected to permeation experiments using the same general procedure as in Example 5. The temperature was 22° C., the feed pressure was 115 psia, and the feed gas mixture was 64% carbon dioxide, 25% methane and 11% propane. The pressure-normalized fluxes of the gases were measured, and the selectivities were calculated. The results are shown in Table 7.

TABLE 7

| Mixed-Gas Pressure-Normalized Flux (GPU) | | | Selectivity (-) | |
|---|---|---|---|---|
| $CO_2$ | $CH_4$ | $C_3H_8$ | $CO_2/CH_4$ | $CO_2/C_3H_8$ |
| 831 | 175 | 95.7 | 4.8 | 8.7 |

In this case, the carbon dioxide/methane selectivity was only 4.8, compared with 13–22 in experiments under similar conditions with the membranes of the invention reported in Example 2.

Example 7

Hyflon® AD60 Multicomponent Mixed-Gas Permeation Properties as a Function of Pressure Hyflon® AD60 membranes were prepared as in Example 2 above and were tested with a gas mixture containing approximately 63% carbon dioxide, 27% methane, and 10% propane at 22° C. at feed pressures ranging from 115 to 415 psia. The saturation vapor pressure of the gas mixture is about 915 psia; thus, at 415 psia, the mixture was about 45% saturated. The measured pressure-normalized gas fluxes are shown graphically in FIG. 2. The calculated carbon dioxide/hydrocarbon selectivities are shown graphically in FIG. 3.

Figure 2:
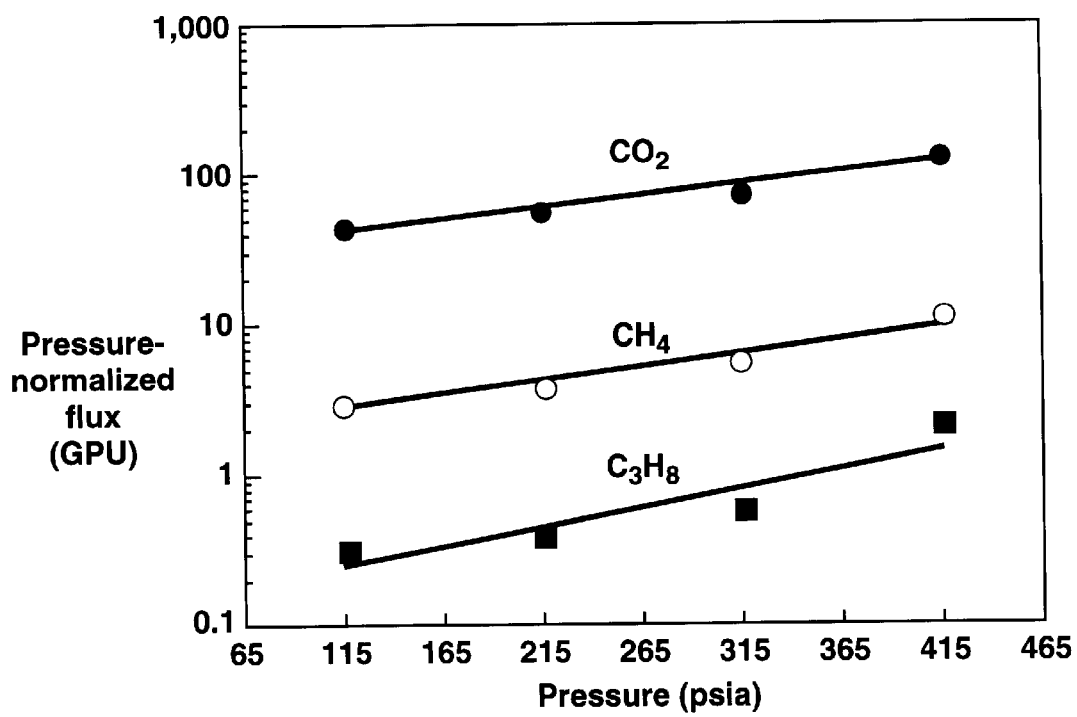
FIG. 2 is a graph of pressure-normalized mixed-gas flux of carbon dioxide, methane and propane as a function of pressure for composite membranes having Hyflon® AD 60 selective layers.
Figure 3:
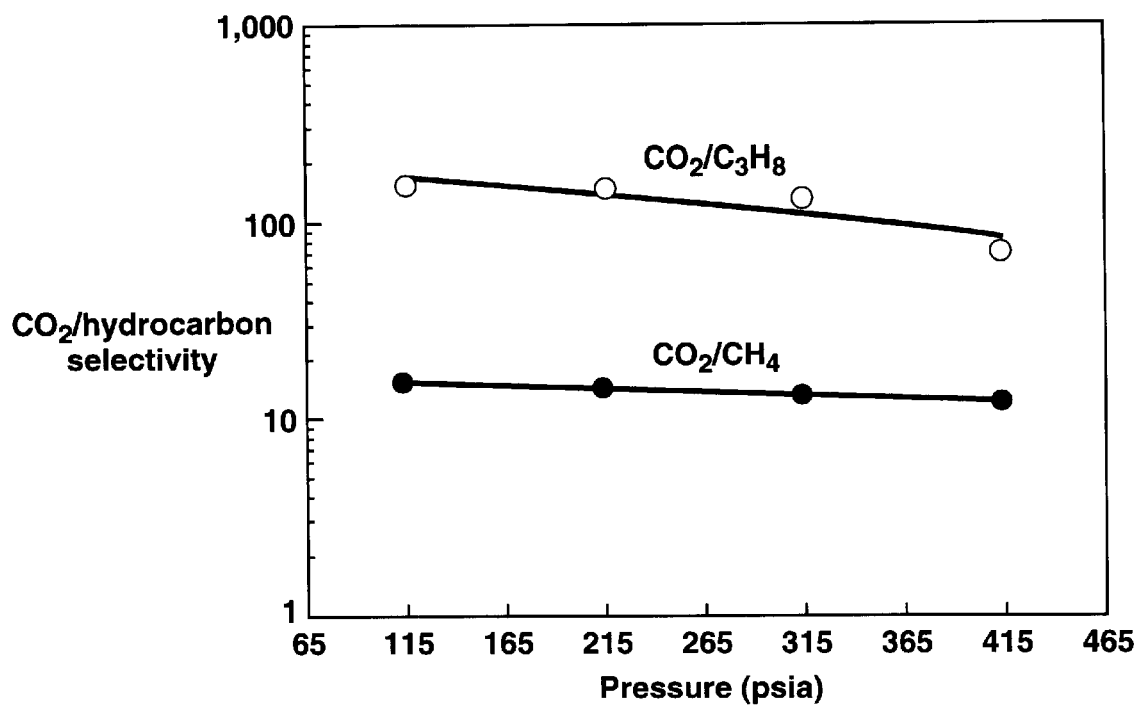
FIG. 3 is a graph of mixed-gas carbon dioxide/methane and carbon dioxide/propane selectivity based on the mixed gas data of FIG. 2.

As can be seen in FIG. 2, the fluxes all increased across the range of pressures. The carbon dioxide flux increased from 46.5 GPU to 136 GPU. The methane flux increased from 3.1 GPU to 11.6 GPU. The propane flux increased from 0.3 GPU to 2.0 GPU. As shown in FIG. 3, the carbon dioxide/methane selectivity decreased only slightly from 15 to 12 across the range of pressures. The oxide/propane selectivity decreased from 152 to 68.

Examples 8–9

Mixed-Gas Permeation Properties in Modules

Example 8

Hyflon® AD60 Membrane Module Permeation Properties at 20° C.

Hyflon® AD60 membranes were prepared as in Example 1. The resulting membranes were rolled into a spiral-wound module, which was tested in a module test apparatus at 20° C. at varying pressures. The feed gas mixture was 65% methane, 10% ethane, 5% propane, and 20% carbon dioxide. The saturation vapor pressure of this gas mixture was calculated to be approximately 1,150 psia. The pressure-normalized gas fluxes were measured and the selectivities calculated. The results are shown in Table 8.

TABLE 8

| Pressure (psia) | Pressure-Normalized Flux (GPU) | | | | $CO_2/CH_4$ Selectivity (-) | $CO_2/C_3H_8$ Selectivity (-) | $CH_4/C_3H_8$ Selectivity (-) |
|---|---|---|---|---|---|---|---|
| | $CH_4$ | $C_2H_6$ | $C_3H_8$ | $CO_2$ | | | |
| 213 | 8.1 | 3.4 | 1.6 | 135 | 16.6 | 84.5 | 5.1 |
| 315 | 7.9 | 3.4 | 1.7 | 117 | 14.8 | 69.0 | 4.6 |
| 414 | 9.2 | 4.1 | 2.0 | 123 | 13.4 | 61.6 | 4.6 |
| 515 | 11.1 | 4.9 | 2.3 | 132 | 11.8 | 57.3 | 4.8 |
| 615 | 14.4 | 6.5 | 2.6 | 148 | 10.2 | 56.7 | 5.5 |
| 715 | 16.0 | 7.4 | 3.0 | 146 | 9.1 | 48.8 | 4.6 |
| 815 | 18.8 | 8.9 | 3.5 | 148 | 7.9 | 42.4 | 5.4 |
| 915 | 22.8 | 11.5 | 4.4 | 152 | 6.7 | 34.5 | 5.2 |
| 1,015 | 29.1 | 15.8 | 7.0 | 146 | 5.0 | 20.8 | 4.1 |

As can be seen, the carbon dioxide flux remained relatively stable across the range of pressures. The methane and propane fluxes increased 3- to 4-fold with increasing pressure, resulting in the carbon dioxide/methane and carbon dioxide/propane selectivities decreasing with increasing pressure. However, even at 615 psia, at greater than 50% saturation, the membrane maintained a carbon dioxide/methane selectivity of 10.

Example 9

Hyflon® AD60 Membrane Module Permeation Properties at 0° C.

The experiment of Example 8 was repeated, except at 0° C. at varying pressures. The feed gas mixture was 65% methane, 10% ethane, 5% propane, and 20% carbon dioxide. At this low temperature, the saturation vapor pressure of the gas mixture was calculated to be approximately 915 psia. The pressure-normalized gas fluxes were measured and the selectivities calculated. The results are shown in Table 9.

TABLE 9

| Pressure (psia) | Pressure-Normalized Flux (GPU) | | | | $CO_2/CH_4$ Selectivity (-) | $CO_2/C_3H_8$ Selectivity (-) | $CH_4/C_3H_8$ Selectivity (-) |
|---|---|---|---|---|---|---|---|
| | $CH_4$ | $C_2H_6$ | $C_3H_8$ | $CO_2$ | | | |
| 213 | 5.3 | 2.6 | 1.7 | 116 | 21.6 | 67.9 | 3.1 |
| 315 | 5.1 | 2.5 | 1.6 | 95.2 | 18.8 | 59.5 | 3.2 |
| 414 | 6.5 | 3.3 | 1.8 | 108 | 16.7 | 59.9 | 3.6 |
| 515 | 7.4 | 3.7 | 2.1 | 120 | 16.2 | 57.0 | 3.5 |
| 615 | 12.5 | 6.7 | 3.2 | 151 | 12.0 | 47.2 | 3.9 |
| 715 | 17.1 | 10.0 | 4.2 | 170 | 10.0 | 40.6 | 4.1 |
| 815 | 22.5 | 13.8 | 6.9 | 184 | 8.1 | 26.6 | 3.3 |
| 915 | 45.2 | 36.6 | 20.5 | 222 | 4.9 | 10.8 | 2.2 |
| 1,015 | 54.5 | 43.7 | 23.6 | 224 | 4.1 | 9.5 | 2.3 |

As can be seen, the carbon dioxide flux nearly doubled across the range of pressures. The methane and propane fluxes increased 10- to 14-fold with increasing pressure, resulting in the carbon dioxide/methane and carbon dioxide/propane selectivities again decreasing with increasing pressure. However, even at 715 psia, at nearly 80% saturation, the membrane maintained a carbon dioxide/methane selectivity of 10.

Example 10

Effect of Temperature and Hydrocarbon Saturation on Selectivity

Figure 4:
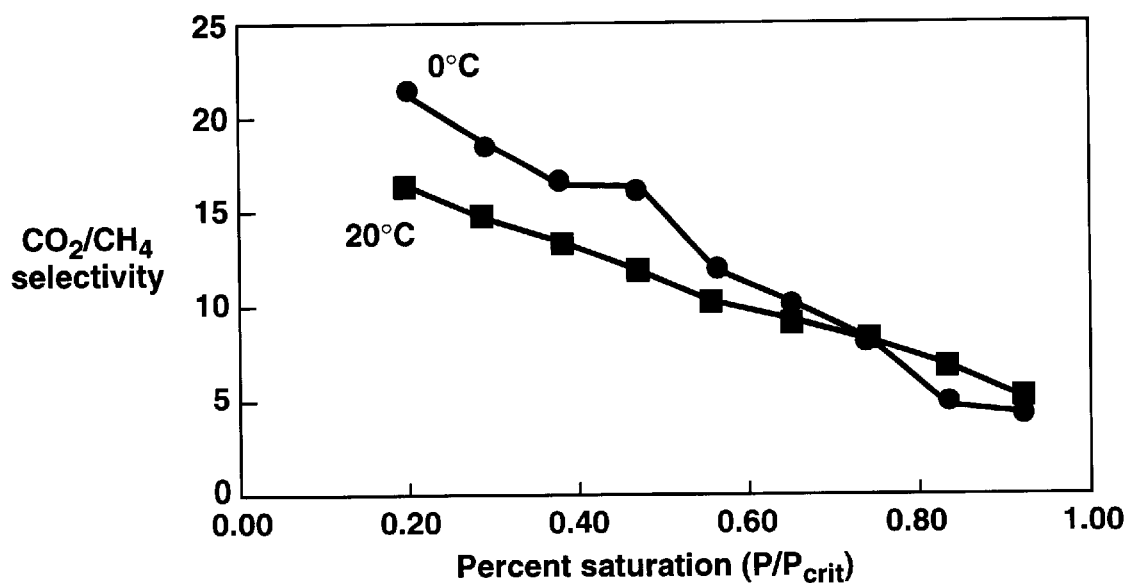
FIG. 4 is a graph of mixed-gas carbon dioxide/methane selectivity as a function of percent saturation of the gas mixture.

Based on the data from Examples 8 and 9, the carbon dioxide/methane selectivity was calculated as a function of temperature and percent saturation, expressed as the ratio of pressure to saturated vapor pressure or critical pressure. The results are shown in FIG. 4. As can be seen, selectivity declines with increasing saturation, but remains acceptable even at high saturation levels.

Examples 11–13

Effect of Carbon Dioxide on Plasticization of Hyflon® Membranes

Example 11

Hyflon® AD60 Membrane Permeation Properties at 20° C. at Varying Pressures

Figure 5:
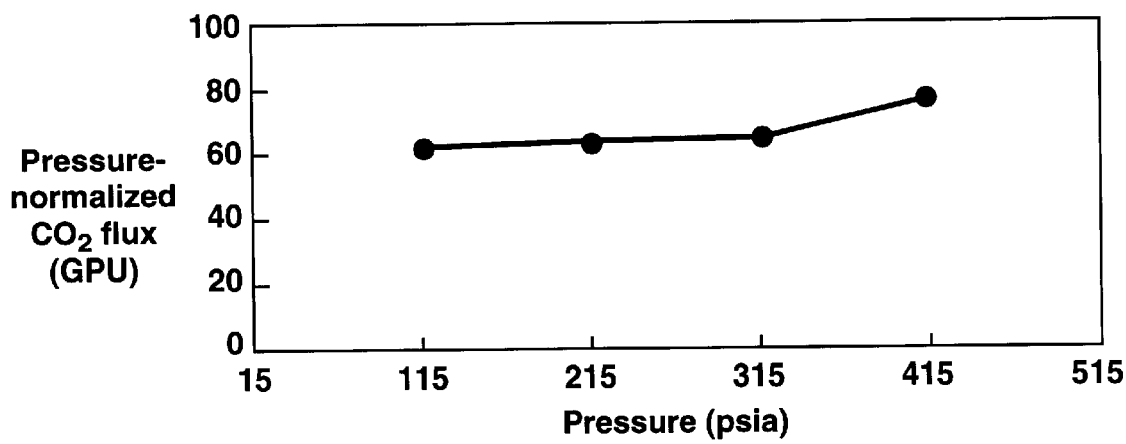
FIG. 5 is a graph of pressure-normalized mixed-gas flux of carbon dioxide at 20° C. as a function of pressure for composite membranes having Hyflon® AD 60 selective layers.
Figure 6:
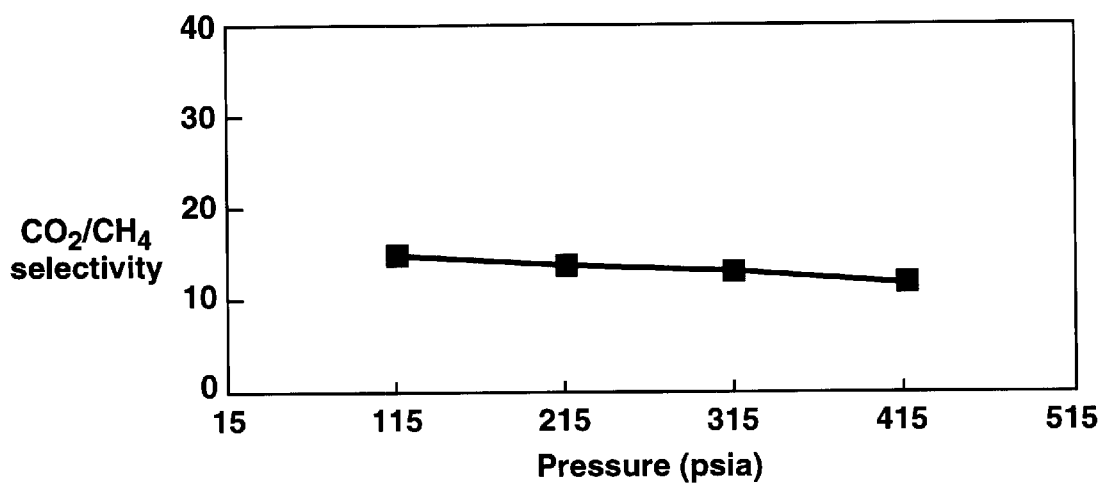
FIG. 6 is a graph of mixed-gas carbon dioxide/methane selectivity based on the mixed-gas data of FIG. 5.

A Hyflon® AD60 membrane was made and a membrane stamp was tested as in Example 1 at 20° C. at varying pressures. The feed gas contained 30% methane and 70% carbon dioxide. The pressure-normalized gas fluxes were measured and the selectivities calculated. The results are shown in FIGS. 5 and 6, respectively. As can be seen in FIG. 5, the carbon dioxide flux increased only slightly from 63 GPU at 115 psia to 76 GPU at 415 psia. FIG. 6 shows that, as a result, the carbon dioxide/methane selectivity decreased only slightly from 15 at 115 psia to 12 at 415 psia.

Example 12

Hyflon® AD60 Membrane Permeation Properties at −20° C. at Varying Pressures

The experiment of Example 11 was repeated, except at −20° C. at varying pressures. At −20° C., the saturation vapor pressure of carbon dioxide is about 285 psia. The gas fluxes were measured and the selectivities calculated. The results are shown in FIGS. 7 and 8, respectively.

Figure 7:
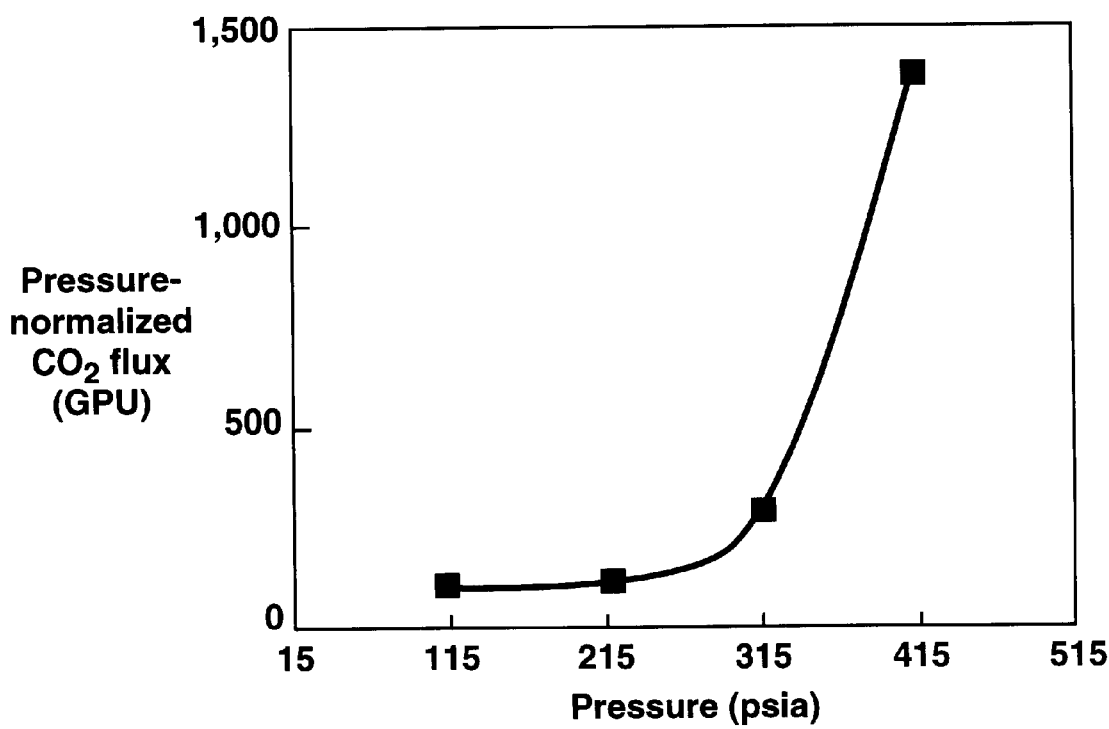
FIG. 7 is a graph of pressure-normalized mixed-gas flux of carbon dioxide at −20° C. as a function of pressure for composite membranes having Hyflon® AD 60 selective layers.
Figure 8:
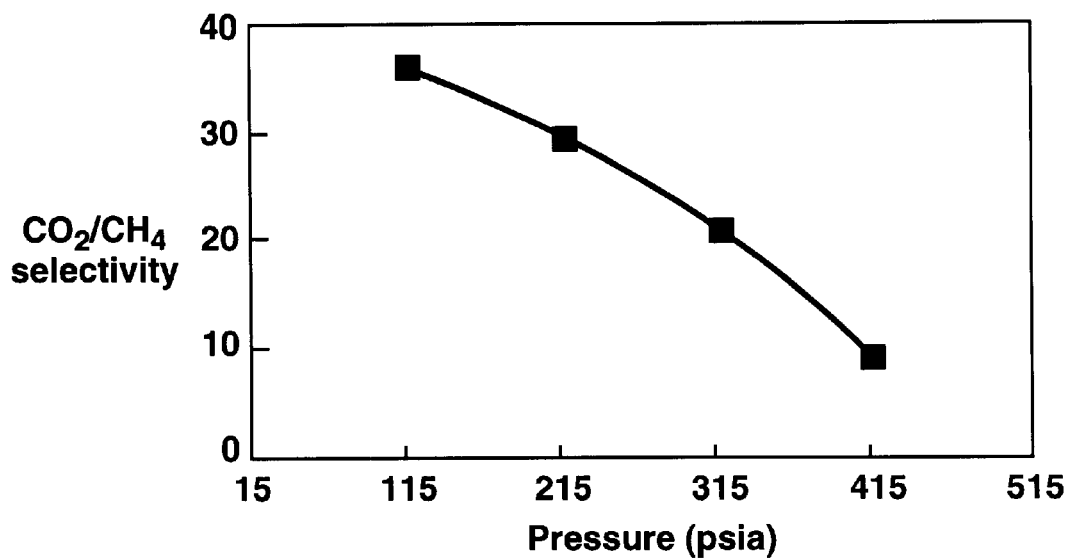
FIG. 8 is a graph of mixed-gas carbon dioxide/methane selectivity based on the mixed-gas data of FIG. 7.

As can be seen in FIG. 7, the carbon dioxide flux increased only slightly from 94 GPU at 115 psia to 113 GPU at 215 psia. The flux then increased to 280 GPU at 315 psia, and then sharply to 1,430 GPU at 415 psia, indicating that the membrane had plasticized under the extreme conditions of low temperature and high pressure. FIG. 8 shows that, as a result, the carbon dioxide/methane selectivity decreased from 36 at 115 psia to 9 at 415 psia.

Example 13

Reversal of Plasticization in Hyflon® AD60 Membrane Module

The membrane stamps used in the experiments of Examples 11 and 12 had been tested for their pure-gas permeation properties before they were used under the high-pressure, low-temperature conditions that caused them to become severely plasticized. After the plasticization experiments had been completed, the membranes were retested with the same set of pure gases. The results of the tests are shown in Table 10.

TABLE 10

| Pressure-Normalized Flux (GPU) | | | | | | | | Selectivity (-) | | | |
| --- | --- | --- | --- | --- | --- | --- | --- | --- | --- | --- | --- |
| Before Test | | | | After Test | | | | Before Test | | After Test | |
| $O_2$ | $N_2$ | $CO_2$ | $CH_4$ | $O_2$ | $N_2$ | $CO_2$ | $CH_4$ | $O_2/N_2$ | $CO_2/CH_4$ | $O_2/N_2$ | $CO_2/CH_4$ |
| 55.0 | 17.2 | 135 | 4.1 | 47.8 | 14.5 | 137 | 6.5 | 3.2 | 19.0 | 3.3 | 21.0 |

As can be seen, the pre- and post-plasticization-test permeation properties are essentially the same, within the limits of experimental error. The Hyflon® membranes were able to regain their original permeation properties. Thus, the plasticization did not cause irreversible damage.

Example 14

Selectivity at Varying Saturation Levels and Partial Pressures

Figure 9:
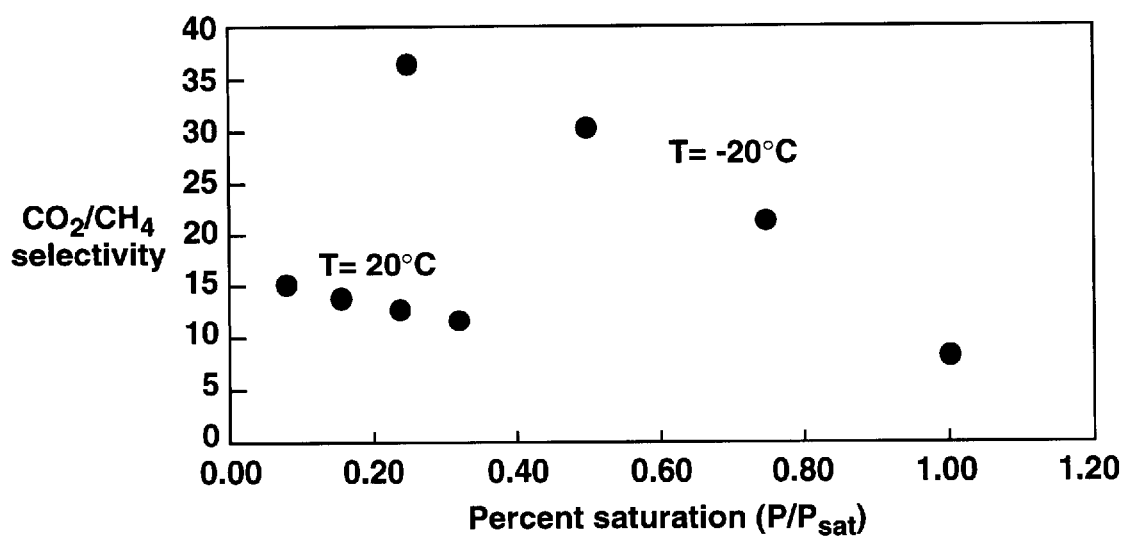
FIG. 9 is a graph of mixed-gas carbon dioxide/methane selectivity as a function of percent saturation of the gas mixture, based on the mixed-gas data of FIGS. 6 and 8.

Based on the data of Examples 11 and 12, the carbon dioxide/methane selectivity was calculated as a function of percent saturation, expressed as the ratio of pressure to saturation vapor pressure. The results are shown graphically in FIG. 9. As can be seen, at 20° C., the selectivity decreased slightly, from 15 to 12, over the saturation range. At −20° C., the selectivity decreased sharply from 36 at about 30% saturation to 9 as the gas mixture approached saturation.

Example 15

Process Design for Carbon Dioxide Removal/Hydrocarbon Recovery from an Associated Gas Stream A computer calculation was performed with a modeling program, ChemCad V (ChemStations, Inc., Houston, Tex.), to illustrate the process of the invention for the recovery of carbon dioxide, pipeline gas, and natural gas liquids from associated gas produced by oilfield flood operations.

It was assumed that the process involved treatment of the raw associated gas by Hyflon® AD60 membranes, followed by treatment of the remaining hydrocarbon-rich gas by membranes selective for the heavier hydrocarbons over methane. In this way, the process was able to deliver three product streams: a carbon dioxide stream suitable for reinjection into the formation; a natural gas liquids (NGL) stream; and a light methane-rich stream, containing only 4% carbon dioxide, suitable for acceptance into a natural gas pipeline.

The flow rate of the raw associated gas was assumed to be 20 MMscfd, and the gas was assumed to be of the following composition:

| | |
| --- | --- |
| Carbon Dioxide | 60.0% |
| Methane | 23.5% |
| Ethane | 7.0% |

-continued

| | |
| --- | --- |
| Propane | 6.0% |
| n-Butane | 3.0% |
| n-Pentane | 0.5% |

Figure 10:
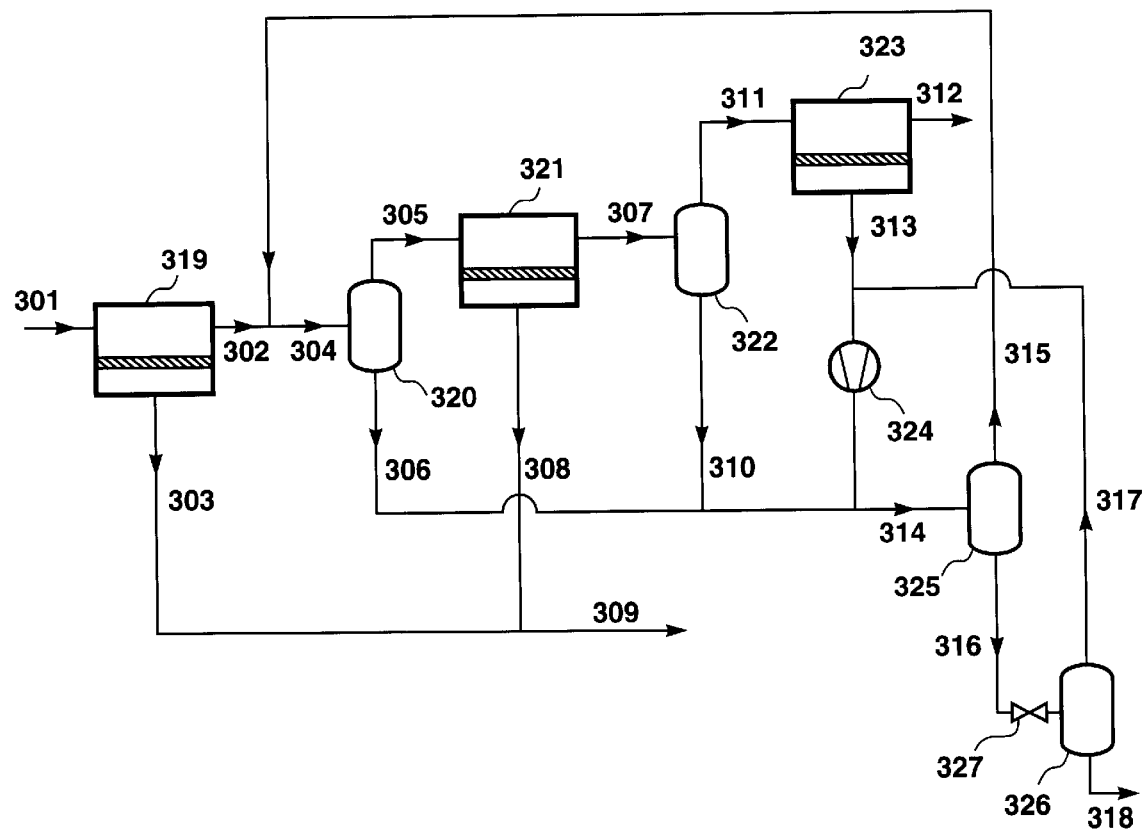
FIG. 10 is a schematic drawing of the process of the invention applied to treatment of an associated gas stream produced by oilfield or gas field flood operations.

The process was assumed to be carried out as shown in FIG. 10. Referring to this figure, gas stream 301 at 415 psia is passed as the feed stream to the first membrane separation unit, 319, which was assumed to contain membranes as in Example 2.

Carbon dioxide permeates the membrane preferentially to produce permeate stream 303, which contains almost 97% carbon dioxide and is suitable for reinjection. As a result of removal of carbon dioxide, the first residue stream, 302, is enriched in hydrocarbons, thereby taking the hydrocarbon content beyond the dewpoint and creating a two-phase mixture. Stream 302 is mixed with the light-hydrocarbon-enriched off-gas, stream 315, from separator 325. The mixed stream, 304, is passed to the first phase separator, 320, from which is withdrawn a small liquid hydrocarbon stream, 306.

The separator overhead stream, 305, is passed to the second membrane separation unit, 321, which was assumed to contain the same membranes as in membrane unit 319. The second residue stream, 307, is passed to the second phase separator, 322, from which is withdrawn an additional liquid hydrocarbon stream, 310. The second permeate stream, 308, is mixed with first permeate stream, 303, to form carbon dioxide-enriched stream 309 for reinjection.

The second separator overhead stream, 311, is passed to the third membrane separation unit, 323, which was assumed to contain silicone rubber membranes. Methane-enriched residue stream 312 may be passed to the pipeline directly or after additional treatment. Permeate stream 313 is mixed with overhead stream 317 and recompressed in compressor 324. This stream is mixed with $C_{2+}$-hydrocarbon-enriched streams 306 and 310, and passed as stream 314 to the third separator, 325. The separator overhead stream, 315, is recirculated to the first residue stream for additional hydrocarbon recovery. The $C_{2+}$-hydrocarbon-enriched bottoms stream, 316, is lowered in pressure through valve 327 and passed to the fourth separator, 326, from which is withdrawn a natural gas liquids product stream, 318. The separator overhead stream, 317, is mixed with the third permeate stream for additional hydrocarbon recovery.

The results of the calculations are shown in Table 11.

TABLE 11

| Stream | 301 | 302 | 303 | 304 | 305 | 306 | 307 | 308 | 309 |
| --- | --- | --- | --- | --- | --- | --- | --- | --- | --- |
| Gas Flow (MMscfd) | 20 | 15.2 | 4.8 | 20.6 | 20.6 | — | 12.3 | 8.3 | 13.1 |

TABLE 11-continued

| | | | | | | | | | |
|---|---|---|---|---|---|---|---|---|---|
| Liquid Flow (bpsd) | — | — | — | — | — | 17.5 | — | — | — |
| Flow (lbmol/h) | 2,196 | 1,668 | 528 | 2,262 | 2,259 | 3.0 | 1,352 | 907 | 1,435 |
| Pressure (psia) | 415 | 415 | 20 | 415 | 415 | 415 | 415 | 20 | 20 |
| Temperature (° F.) | 68 | 58 | 63 | 59 | 59 | 59 | 66 | 62 | 63 |
| Component (mol %): | | | | | | | | | |
| Carbon Dioxide | 60.0 | 48.4 | 96.7 | 39.5 | 39.5 | 17.3 | 8.2 | 86.2 | 90.0 |
| Methane | 23.5 | 30.1 | 2.6 | 32.2 | 32.2 | 6.4 | 47.1 | 9.9 | 7.2 |
| Ethane | 7.0 | 9.1 | 0.5 | 14.4 | 14.4 | 12.6 | 22.2 | 2.7 | 1.9 |
| Propane | 6.0 | 7.8 | 0.2 | 9.8 | 9.8 | 25.4 | 15.7 | 0.9 | 0.7 |
| n-Butane | 3.0 | 3.9 | 0.1 | 3.7 | 3.7 | 28.0 | 6.0 | 0.2 | 0.2 |
| n-Pentane | 0.5 | 0.7 | — | 0.5 | 0.5 | 10.3 | 0.9 | — | — |

| Stream | 310 | 311 | 312 | 313 | 314 | 315 | 316 | 317 | 318 |
|---|---|---|---|---|---|---|---|---|---|
| Gas Flow (MMscfd) | — | 11.3 | 5.4 | 5.9 | — | 5.4 | — | 1.1 | — |
| Liquid Flow (bpsd) | 667 | — | — | — | 1,634 | — | 1,687 | — | 1,070 |
| Flow (lbmol/h) | 112 | 1,241 | 591 | 650 | 884 | 594 | 289 | 119 | 170 |
| Pressure (psia) | 415 | 415 | 415 | 20 | 415 | 415 | 415 | 20 | 20 |
| Temperature (° F.) | 66 | 66 | 22 | 44 | 66 | 63 | 63 | −62 | −62 |
| Component (mol %): | | | | | | | | | |
| Carbon Dioxide | 3.4 | 8.6 | 4.0 | 12.8 | 11.6 | 14.4 | 6.0 | 13.0 | 1.1 |
| Methane | 9.9 | 50.5 | 69.7 | 33.0 | 28.0 | 37.9 | 7.8 | 18.6 | 0.3 |
| Ethane | 18.8 | 22.5 | 17.9 | 26.5 | 27.8 | 29.2 | 25.0 | 43.3 | 12.2 |
| Propane | 34.0 | 14.1 | 7.0 | 20.5 | 22.5 | 15.3 | 37.3 | 22.8 | 47.5 |
| n-Butane | 27.7 | 4.0 | 1.3 | 6.5 | 8.6 | 3.0 | 20.2 | 2.2 | 32.9 |
| n-Pentane | 6.3 | 0.4 | 0.1 | 0.7 | 1.3 | 0.2 | 3.6 | 0.1 | 6.0 |

— = less than 0.1
Membrane area = 1,000 + 4,350 m² (Hyflon ® AD60) + 419 m² (Silicone rubber)
Horsepower requirement (theoretical) = 1,092 hp The 20 MMscfd of raw associated gas entering the system yields 13.1 MMscfd of carbon dioxide for reinjection, and 5.4 MMscfd of pipeline-quality natural gas. In addition, nearly 1,100 barrels per day (bpsd) of natural gas liquids (stream 318) are recovered.

Examples 16–17

Comparative Process Designs for Carbon Dioxide Removal/Hydrocarbon Recovery From an Associated Gas Stream Example 16

Cellulose Acetate Membranes, not in Accordance with the Invention

A computer calculation was performed with a modeling program, ChemCad V (ChemStations, Inc., Houston, Tex.), to illustrate the process of the invention for the recovery of carbon dioxide, pipeline gas, and natural gas liquids from associated gas produced by oilfield flood operations. It was assumed that the process involved treatment of the raw associated gas by cellulose acetate membranes. The process was able to deliver three product streams: a carbon dioxide stream suitable for reinjection into the formation; a natural gas liquids (NGL) stream; and a methane-rich stream, containing only 2% carbon dioxide, suitable for acceptance into a natural gas pipeline.

The flow rate of the raw associated gas was assumed to be 100 MMscfd, and the gas was assumed to be of the following composition:

| | |
|---|---|
| Carbon Dioxide | 70.0% |
| Methane | 25.0% |
| Ethane | 2.0% |
| Propane | 1.0% |
| n-Butane | 1.0% |
| n-Pentane | 1.0% |

Figure 11:
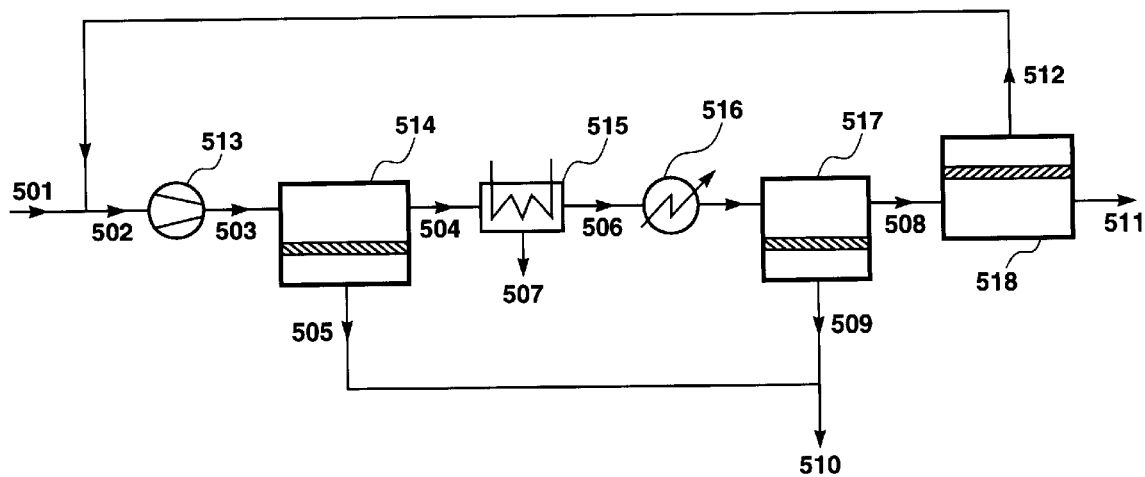
FIG. 11 is a schematic drawing of another embodiment of the invention applied to treatment of an associated gas stream produced by oilfield or gas field flood operations.

The process was assumed to be carried out as shown in FIG. 11, using cellulose acetate membranes providing a carbon dioxide pressure-normalized flux of 50 GPU in all membrane steps. Referring to this figure, gas stream 501 at 25 psia is mixed with recycle stream 512 to form combined stream 502, which is compressed to 400 psia in compressor 513. Compressed stream 503 is passed as the feed stream to the first membrane separation step, 514.

To approximate the rising selectivity that results as the feed stream becomes depleted of carbon dioxide during passage across the membranes of step 514, the calculation of step 514 was performed in two halves, using a carbon dioxide/methane selectivity of 5 for the first half of the calculation and a selectivity of 10 for the second.

Carbon dioxide permeates the membrane preferentially to produce permeate stream 505, which contains about 85% carbon dioxide. As a result of removal of carbon dioxide, the first residue stream, 504, is enriched in hydrocarbons, thereby taking the hydrocarbon content to or beyond the dewpoint. To remove hydrocarbons, stream 504 is cooled and separated in separator 515 into a natural gas liquids (NGL) stream, 507, and methane-enriched separator overhead stream, 506.

The separator overhead stream, 506, is reheated by heater 516 and passed to membrane separation unit, 517. The carbon dioxide/methane selectivity in this step was assumed to be 20. This step separates stream 506 into second residue stream, 508, and second permeate stream, 509, which is mixed with first permeate stream 505 to form stream 510 for reinjection directly or after further treatment.

Second residue stream 508 passes as feed to third membrane step 518, assumed to have a carbon dioxide/methane selectivity of 25. This step separates feed stream, 508, into a third residue stream, 511, and a third permeate stream, 512. Residue stream 511 contains only 2% carbon dioxide and may be passed to a natural gas pipeline. Permeate stream 512 is recirculated to the front of the process for recompression and further carbon dioxide-removal treatment.

The results of the calculations are shown in Table 12.

Step 514 (calculated in two halves): 20 and 22

Step 517: 24

Step 518: 26

All other parameters were assumed to be as in Example 16. The process was again designed to deliver three product streams: a carbon dioxide stream suitable for reinjection into

TABLE 12

| Stream | 501 | 503 | 504 | 505 | 506 | 507 | 508 | 509 | 510 | 511 |
|---|---|---|---|---|---|---|---|---|---|---|
| Gas Flow (MMscfd) | 100.0 | 103.3 | 28.7 | 74.5 | 28.3 | — | 16.4 | 11.9 | 86.4 | 13.1 |
| Flow (kg/h) | 195,627 | 200,787 | 43,338 | 157,449 | 42,039 | 1,299 | 20,880 | 21,159 | 178,608 | 15,720 |
| Pressure (psia) | 25 | 400 | 400 | 100 | 400 | 400 | 400 | 100 | 100 | 400 |
| Temperature (° C.) | 30 | 50 | 31 | 42 | 50 | 20 | 44 | 47 | 43 | 41 |
| Component (mol %): | | | | | | | | | | |
| Carbon Dioxide | 70.0 | 69.1 | 30.0 | 84.2 | 30.3 | 11.1 | 10.0 | 58.3 | 80.6 | 2.0 |
| Methane | 25.0 | 25.8 | 56.7 | 13.9 | 57.4 | 9.4 | 72.6 | 36.3 | 17.0 | 78.2 |
| Ethane | 2.0 | 2.1 | 4.9 | 0.9 | 5.0 | 3.9 | 6.6 | 2.7 | 1.2 | 7.3 |
| Propane | 1.0 | 1.0 | 2.8 | 0.3 | 2.8 | 6.9 | 4.0 | 1.0 | 0.4 | 4.7 |
| n-Butane | 1.0 | 1.0 | 2.8 | 0.3 | 2.5 | 19.8 | 3.7 | 0.9 | 0.4 | 4.3 |
| n-Pentane | 1.0 | 1.0 | 2.8 | 0.3 | 2.1 | 48.9 | 3.0 | 0.8 | 0.4 | 3.5 |

Membrane area = 62,062 + 48,179 + 17,810 m$^2$
Horsepower requirement (theoretical) = 18,674 hp The 100 MMscfd of raw associated gas entering the system yields 86.4 MMscfd of carbon dioxide for reinjection (stream 510), and 13.1 MMscfd of pipeline-quality natural gas (stream 511). In addition, 1,300 kg/h of natural gas liquids (stream 507) are recovered.

the formation; a natural gas liquids (NGL) stream; and a methane-rich stream, containing only 2% carbon dioxide, suitable for acceptance into a natural gas pipeline.

The results of the calculations are shown in Table 13.

TABLE 13

| Stream | 501 | 503 | 504 | 505 | 506 | 507 | 508 | 509 | 510 | 511 |
|---|---|---|---|---|---|---|---|---|---|---|
| Gas Flow (MMscfd) | 100.0 | 104.5 | 39.9 | 64.6 | 39.7 | — | 23.8 | 16.0 | 80.5 | 19.3 |
| Flow (kg/h) | 195,627 | 202,804 | 59,171 | 143,632 | 58,563 | 608 | 29,867 | 28,696 | 172,328 | 22,691 |
| Pressure (psia) | 25 | 50 | 400 | 100 | 400 | 400 | 400 | 100 | 100 | 400 |
| Temperature (° C.) | 30 | 400 | 35 | 43 | 50 | 20 | 44 | 47 | 44 | 41 |
| Component (mol %): | | | | | | | | | | |
| Carbon Dioxide | 70.0 | 68.9 | 30.0 | 92.9 | 30.1 | 11.0 | 10.0 | 60.0 | 86.4 | 2.0 |
| Methane | 25.0 | 26.1 | 58.1 | 6.3 | 58.3 | 9.5 | 73.8 | 35.3 | 12.0 | 79.4 |
| Ethane | 2.0 | 2.0 | 4.6 | 0.4 | 4.6 | 3.6 | 6.2 | 2.2 | 0.8 | 7.1 |
| Propane | 1.0 | 1.0 | 2.4 | 0.1 | 2.4 | 6.1 | 3.5 | 0.8 | 0.3 | 4.0 |
| n-Butane | 1.0 | 1.0 | 2.4 | 0.1 | 2.4 | 18.4 | 3.4 | 0.8 | 0.3 | 3.9 |
| n-Pentane | 1.0 | 1.0 | 2.4 | 0.1 | 2.2 | 51.4 | 3.1 | 0.8 | 0.3 | 3.6 |

Membrane area = 17,233 + 19,202 + 6,842 m$^2$
Horsepower requirement (theoretical) = 18,909 hp

Example 17

Cytop® Membranes

The computer calculation of Example 16 was repeated using a Cytop polyperfluoro (alkenyl vinyl ether) membrane instead of cellulose acetate in all membrane units. The Cytop membranes were assumed to provide a carbon dioxide pressure-normalized flux of 200 GPU in all membrane steps, and carbon dioxide/methane selectivity as follows:

The 100 MMscfd of raw associated gas entering the system yields 80.5 MMscfd of carbon dioxide for reinjection (stream 510). This gas is substantially more concentrated in carbon dioxide than that generated by the system with cellulose acetate membrane. The process also produces 19.3 MMscfd of pipeline-quality natural gas (stream 511), compared with 13.1 MMscfd in the previous example, and 608 kg/h of natural gas liquids (stream 507) compared with 1,300 kg/h.

Because of the much higher flux of Cytop membranes, the process uses only about one-third the total membrane area of the same process carried out with cellulose acetate membranes.

Examples 18–19

Comparative Process Designs for Carbon Dioxide Removal/Hydrocarbon Recovery from a Natural Gas Stream Example 18

Cellulose Acetate Membranes, not in Accordance with the Invention

A computer calculation was performed to illustrate the process of the invention for the removal of carbon dioxide from natural gas. It was assumed that the process involved treatment of the raw gas by cellulose acetate membranes providing a carbon dioxide/methane selectivity of 15 and a pressure-normalized carbon dioxide flux of 50 GPU in both membrane units. The process was able to deliver a methane-rich stream, containing only 2% carbon dioxide, suitable for acceptance into a natural gas pipeline.

The flow rate of the raw gas was assumed to be 100 MMscfd, and the gas was assumed to be of the following composition:

| | |
|---|---|
| Carbon Dioxide | 10.0% |
| Methane | 75.0% |
| Ethane | 10.0% |
| Propane | 3.0% |
| n-Butane | 1.0% |
| n-Pentane | 1.0% |

Figure 12:
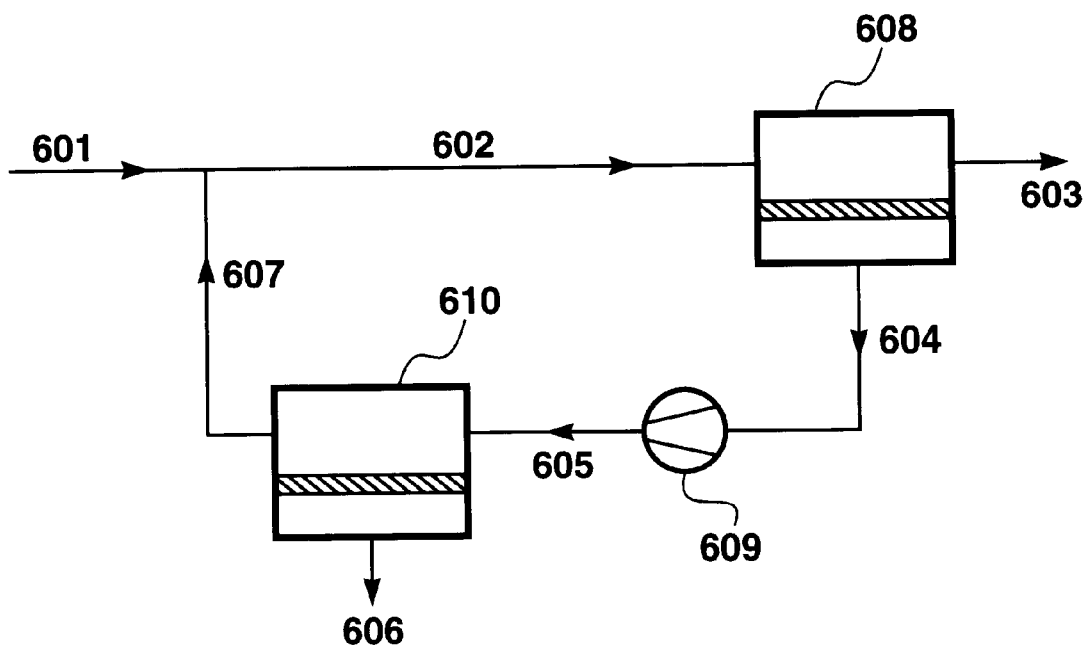
FIG. 12 is a schematic drawing of an embodiment of the process of the invention applied to natural gas treatment.

The process was assumed to be carried out as shown in FIG. 12. Referring to this figure, raw gas stream 601, assumed to be at 1,000 psia, is mixed with recycle stream 607 to form combined stream 602. Stream 602 is passed as the feed stream to the first membrane separation stage, 608.

This stage produces a carbon-dioxide-depleted residue stream, 603, of pipeline quality. Carbon dioxide permeates the membrane preferentially to produce methane-depleted permeate stream 604 assumed to be at a pressure of 50 psia. This stream is recompressed to 1,000 psia in compressor 609 and passed as feed stream 605 to the second membrane separation stage, 610. Second methane-depleted permeate stream 606 is withdrawn. Carbon dioxide-depleted second residue stream 607, at 1,000 psia, is recirculated to the front of the process for further methane recovery.

The results are shown in Table 14.

TABLE 14

| Stream | 601 | 602 | 603 | 604 | 606 | 607 |
|---|---|---|---|---|---|---|
| Gas Flow (MMscfd) | 100.0 | 115.9 | 89.6 | 26.2 | 10.4 | 15.9 |
| Flow (kg/h) | 116,156 | 133,071 | 95,237 | 37,832 | 20,917 | 16,915 |
| Pressure (psia) | 1,000 | 1,000 | 1,000 | 50 | 50 | 1,000 |
| Temperature (° C.) | 5 | 8 | 0 | 4 | 40 | 30 |
| Component (mol %): | | | | | | |
| Carbon Dioxide | 10.0 | 10.0 | 2.0 | 37.3 | 79.1 | 10.0 |
| Methane | 75.0 | 76.1 | 81.3 | 58.1 | 20.2 | 82.8 |
| Ethane | 10.0 | 9.4 | 11.1 | 3.5 | 0.6 | 5.3 |
| Propane | 3.0 | 2.7 | 3.3 | 0.7 | 0.1 | 1.1 |
| n-Butane | 1.0 | 0.9 | 1.1 | 0.2 | — | 0.4 |
| n-Pentane | 1.0 | 0.9 | 1.1 | 0.2 | — | 0.4 |

Membrane area = 37,867 + 5,649 m$^2$
Horsepower requirement (theoretical) = 4,894 hp The 100 MMscfd of raw gas entering the system yields 89.6 MMscfd of natural gas (stream 603), suitable for acceptance into the natural gas pipeline. The methane loss into the permeate (stream 606) is about 2.8% of the feed methane content.

Example 19

Cytop® Membranes

The computer calculation of Example 18 was repeated using a Cytop polyperfluoro (alkenyl vinyl ether) membrane instead of cellulose acetate in both membrane units. The Cytop membranes were assumed to provide a carbon dioxide pressure-normalized flux of 200 GPU and a carbon dioxide/methane selectivity of 30. All other parameters were assumed to be as in Example 18. The process was again designed to deliver a methane-rich product stream, containing only 2% carbon dioxide, suitable for acceptance into a natural gas pipeline.

The results of the calculations are shown in Table 15.

TABLE 15

| Stream | 601 | 602 | 603 | 604 | 606 | 607 |
|---|---|---|---|---|---|---|
| Gas Flow (MMscfd) | 100.0 | 109.9 | 91.0 | 18.9 | 9.0 | 9.9 |
| Flow (kg/h) | 116,156 | 126,671 | 96,489 | 30,183 | 19,669 | 10,515 |
| Pressure (psia) | 1,000 | 1,000 | 1,000 | 50 | 50 | 1,000 |
| Temperature (° C.) | 5 | 48 | 42 | 45 | 37 | 25 |

TABLE 15-continued

| Stream | 601 | 602 | 603 | 604 | 606 | 607 |
|---|---|---|---|---|---|---|
| Component (mol %): | | | | | | |
| Carbon Dioxide | 10.0 | 10.0 | 2.0 | 48.6 | 90.9 | 10.0 |
| Methane | 75.0 | 75.7 | 81.5 | 47.6 | 8.8 | 83.0 |
| Ethane | 10.0 | 9.6 | 11.0 | 2.8 | 0.2 | 5.2 |
| Propane | 3.0 | 2.8 | 3.3 | 0.6 | — | 1.1 |
| n-Butane | 1.0 | 0.9 | 1.1 | 0.2 | — | 0.4 |
| n-Pentane | 1.0 | 0.9 | 1.1 | 0.2 | — | 0.4 |

— = less than 0.1
Membrane area = 11,112 + 1,132 m$^2$
Horsepower requirement (theoretical) = 3,995 hp The 100 MMscfd of raw associated gas entering the system yields 91.0 MMscfd of natural gas (stream 603) suitable for acceptance into the natural gas pipeline. The methane loss into the permeate (stream 606) is about 1% of the feed methane content.

Using the Cytop membranes cuts methane losses into the permeate stream to about one third the loss with the cellulose acetate membranes. The process also requires 20% less compressor horsepower, and uses less than one-third the total membrane area of the previous example.

Examples 20–23

Options for Carbon Dioxide Removal and Ethylene Recovery in Petrochemical Processes Example 20

A computer calculation was performed to illustrate the process of the invention for the separation of carbon dioxide and argon from off-gas from the manufacture of an ethylene-derived petrochemical. The goal of the process was assumed to be to purge carbon dioxide and argon, and to recover ethylene for return to the manufacturing reactor. The separation was assumed to be carried out using perfluorinated dioxole membranes, such as Hyflon® AD60.

The flow rate of the off-gas was assumed to be 0.29 MMscfd, and the gas was assumed to be of the following composition:

| Carbon Dioxide | 17.0% |
|---|---|
| Ethylene | 55.0% |
| Oxygen | 8.0% |
| Nitrogen | 12.0% |
| Argon | 8.0% |

The process was assumed to be carried out to produce an ethylene-enriched residue stream containing 2% carbon dioxide for recycle to the reactor. The results of the calculations are shown in Table 16, where stream numbers correspond to FIG. 1.

TABLE 16

| Stream | 1 | 4 | 5 |
|---|---|---|---|
| Gas Flow (MMscfd) | 0.29 | 0.10 | 0.19 |
| Flow (kg/h) | 486 | 149 | 336 |
| Pressure (psia) | 200 | 200 | 50 |
| Temperature (° C.) | 30 | 23 | 27 |

TABLE 16-continued

| Stream | 1 | 4 | 5 |
|---|---|---|---|
| Component (mol %): | | | |
| Carbon Dioxide | 17.0 | 2.0 | 24.8 |
| Ethylene | 55.0 | 81.2 | 41.4 |
| Oxygen | 8.0 | 2.3 | 11.0 |
| Nitrogen | 12.0 | 10.8 | 12.6 |
| Argon | 8.0 | 3.7 | 10.2 |

Membrane area = 172 m$^2$

As can be seen, the process produces a stream enriched to over 80% ethylene for recycle, and reduces ethylene content in the purge stream to about 40%.

Example 21

The calculation of Example 20 was repeated, this time with the goal of reducing the carbon dioxide content of the recycle stream to 5%. All other parameters were assumed to be as in Example 20. The results of the calculation are shown in Table 17.

TABLE 17

| Stream | 1 | 4 | 5 |
|---|---|---|---|
| Gas Flow (MMscfd) | 0.29 | 0.15 | 0.14 |
| Flow (kg/h) | 486 | 234 | 251 |
| Pressure (psia) | 200 | 200 | 50 |
| Temperature (° C.) | 30 | 26 | 28 |
| Component (mol %): | | | |
| Carbon Dioxide | 17.0 | 5.0 | 30.1 |
| Ethylene | 55.0 | 73.2 | 35.1 |
| Oxygen | 8.0 | 4.1 | 12.3 |
| Nitrogen | 12.0 | 12.2 | 11.8 |
| Argon | 8.0 | 5.5 | 10.7 |

Membrane area = 111 m$^2$

In this case, the process produces a stream enriched to about 73% ethylene for recycle, and reduces ethylene content in the purge stream to about 35%.

Example 22

The calculation of Example 20 was repeated, this time with the goal of reducing the carbon dioxide content of the recycle stream to 8%. All other parameters were assumed to be as in Example 20. The results of the calculation are shown in Table 18.

TABLE 18

| Stream | 1 | 4 | 5 |
|---|---|---|---|
| Gas Flow (MMscfd) | 0.29 | 0.19 | 0.10 |
| Flow (kg/h) | 486 | 302 | 183 |
| Pressure (psia) | 200 | 200 | 50 |
| Temperature (° C.) | 30 | 27 | 29 |
| Component (mol %): | | | |
| Carbon Dioxide | 17.0 | 8.0 | 34.3 |
| Ethylene | 55.0 | 67.5 | 30.9 |
| Oxygen | 8.0 | 5.4 | 13.0 |
| Nitrogen | 12.0 | 12.5 | 11.1 |
| Argon | 8.0 | 6.6 | 10.8 |

Membrane area = 72 m$^2$

In this case, the process produces a stream enriched to about 68% ethylene for recycle, and reduces ethylene content in the purge stream to about 30%.

Example 23

The results of Examples 20–22 are summarized in Table 19.

TABLE 19

| Example # | Membrane Area (m$^2$) | Recycle Stream Content (%) | | | Recycle stream flow (MMscfd) | Ethylene loss in purge (%) |
|---|---|---|---|---|---|---|
| | | CO$_2$ | Argon | Ethylene | | |
| 20 | 172 | 2 | 3.7 | 81.2 | 0.10 | 49 |
| 21 | 111 | 5 | 5.5 | 73.2 | 0.15 | 30 |
| 22 | 72 | 8 | 6.6 | 67.5 | 0.19 | 19 |

As can be seen, the membrane area can be adjusted depending on the key performance parameter for any specific circumstance.

We claim:

1. A process for separating carbon dioxide from a gaseous hydrocarbon in a multicomponent gas mixture comprising carbon dioxide, the gaseous hydrocarbon, and a third gaseous component, the process comprising the steps of:
   (a) bringing the gas mixture into contact with the feed side of a separation membrane having a feed side and a permeate side, the separation membrane having a selective layer comprising:
       a polymer comprising repeat units of a fluorinated cyclic structure of an at least 5-member ring, the polymer having a fractional free volume no greater than about 0.3;
   (b) providing a driving force for transmembrane permeation;
   (c) withdrawing from the permeate side a permeate stream enriched in carbon dioxide compared to the gas mixture;
   (d) withdrawing from the feed side a residue stream depleted in carbon dioxide compared to the gas mixture.

2. The process of claim 1, wherein the gaseous hydrocarbon is a C$_{3+}$ hydrocarbon.

3. The process of claim 1, wherein the gaseous hydrocarbon is methane.

4. The process of claim 1, wherein the gaseous hydrocarbon is ethylene.

5. The process of claim 1, wherein the third gaseous component is chosen from the group consisting of C$_{2+}$ hydrocarbons, inert gases, hydrogen sulfide and water vapor.

6. The process of claim 1, wherein the gas mixture is chosen from the group consisting of natural gas, associated gas, and a gas stream from a petrochemical operation.

7. The process of claim 1, wherein the polymer comprises a perfluorinated polymer.

8. The process of claim 1, wherein the polymer is formed from a monomer selected from the group consisting of fluorinated dioxoles, fluorinated dioxolanes and fluorinated cyclically polymerizable alkyl ethers.

9. The process of claim 1, wherein the polymer comprises a perfluorinated polyimide.

10. The process of claim 1, wherein the repeat unit is 2,2,4-trifluoro-5-trifluoromethoxy-1,3-dioxole.

11. The process of claim 1, wherein the polymer is a polyperfluoro (alkenyl vinyl ether).

12. The process of claim 1, wherein the polymer comprises a copolymer.

13. The process of claim 1, wherein the polymer has the formula:

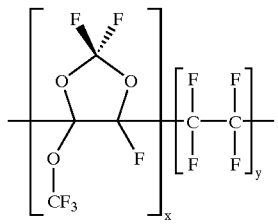

where x and y represent the relative proportions of the dioxole and the tetrafluoroethylene blocks, such that x+y=1.

14. The process of claim 1, wherein the polymer has the formula:

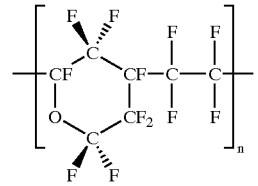

where n is a positive integer.

15. The process of claim 1, wherein the gas mixture, as brought into contact with the feed side, has a total C$_{3+}$ hydrocarbons partial pressure of at least about 25 psia.

16. The process of claim 1, wherein the gas mixture, as brought into contact with the feed side, has a carbon dioxide partial pressure of at least about 50 psia.

17. The process of claim 1, wherein the separation membrane provides a pressure-normalized carbon dioxide flux when in use in the process of at least about 50 GPU.

18. The process of claim 1, wherein the gas mixture comprises at least about 10% carbon dioxide.

19. The process of claim 1, further comprising passing at least one of the gas mixture, the residue stream and the permeate stream to additional separation treatment.

20. The process of claim 1, wherein the gas mixture is associated gas from a flood operation and wherein at least a portion of the permeate stream is used as a reinjection gas for the flood operation.

21. The process of claim 1, wherein the residue stream is further separated into a light gas stream and an NGL stream.

22. The process of claim 1, wherein at least a portion of the residue stream is passed to a natural gas pipeline.

23. The process of claim 1, wherein the gas mixture is natural gas, the third gaseous component is nitrogen, and the residue stream contains no more than about 4% nitrogen and no more than about 2% carbon dioxide.

24. The process of claim 1, further comprising removing a contaminant material that has been brought into a module housing the separation membrane during operation of steps (a) through (d) by:

(e) discontinuing steps (a) through (d); and (f) flushing the module with an organic solvent.

25. A process for separating carbon dioxide from a gaseous hydrocarbon in a multicomponent gas mixture comprising carbon dioxide, the gaseous hydrocarbon, and a third gaseous component, the process comprising the steps of:

(a) bringing the gas mixture into contact with the feed side of a separation membrane having a feed side and a permeate side, the membrane having a selective layer comprising a polymer having:

(i) a ratio of fluorine to carbon atoms in the polymer greater than 1:1;

(ii) a fractional free volume no greater than about 0.3; and (iii) a glass transition temperature of at least about 100° C.;

and the separation membrane being characterized by a post-exposure selectivity for carbon dioxide over the first gaseous hydrocarbon, after exposure of the separation membrane to liquid toluene and subsequent drying, that is at least about 65% of a pre-exposure selectivity for carbon dioxide over the gaseous hydrocarbon, as measured pre- and post-exposure with a test gas mixture of the same composition and under like conditions;

(b) providing a driving force for transmembrane permeation;

(c) withdrawing from the permeate side a permeate stream enriched in carbon dioxide compared to the gas mixture;

(d) withdrawing from the feed side a residue stream depleted in carbon dioxide compared to the gas mixture.

26. The process of claim 25, wherein the gaseous hydrocarbon is a $C_{3+}$ hydrocarbon.

27. The process of claim 25, wherein the gaseous hydrocarbon is methane.

28. The process of claim 25, wherein the gaseous hydrocarbon is ethylene.

29. The process of claim 25, wherein the third gaseous component is chosen from the group consisting of $C_{2+}$ hydrocarbons, inert gases, hydrogen sulfide and water vapor.

30. The process of claim 25, wherein the gas mixture is chosen from the group consisting of natural gas, associated gas, and a gas stream from a petrochemical operation.

31. The process of claim 25, wherein the polymer comprises a perfluorinated polymer.

32. The process of claim 25, wherein the polymer is formed from a monomer selected from the group consisting of fluorinated dioxoles, fluorinated dioxolanes and fluorinated cyclically polymerizable alkyl ethers.

33. The process of claim 25, wherein the polymer comprises a perfluorinated polyimide.

34. The process of claim 25, wherein the repeat unit is 2,2,4-trifluoro-5-trifluoromethoxy-1,3-dioxole.

35. The process of claim 25, wherein the polymer is a polyperfluoro (alkenyl vinyl ether).

36. The process of claim 25, wherein the polymer comprises a copolymer.

37. The process of claim 25, wherein the polymer has the formula:

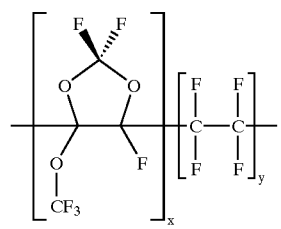

where x and y represent the relative proportions of the dioxole and the tetrafluoroethylene blocks, such that x+y=1.

38. The process of claim 25, wherein the polymer has the formula:

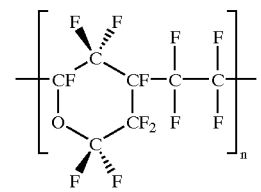

where n is a positive integer.

39. The process of claim 25, wherein the gas mixture, as brought into contact with the feed side, has a total $C_{3+}$ hydrocarbons partial pressure of at least about 25 psia.

40. The process of claim 25, wherein the gas mixture, as brought into contact with the feed side, has a carbon dioxide partial pressure of at least about 50 psia.

41. The process of claim 25, wherein the separation membrane provides a pressure-normalized carbon dioxide flux when in use in the process of at least about 50 GPU.

42. The process of claim 25, wherein the gas mixture comprises at least about 10% carbon dioxide.

43. The process of claim 25, further comprising passing at least one of the gas mixture, the residue stream and the permeate stream to additional separation treatment.

44. The process of claim 25, wherein the gas mixture is associated gas from a flood operation and wherein at least a portion of the permeate stream is used as a reinjection gas for the flood operation.

45. The process of claim 25, wherein the residue stream is further separated into a light gas stream and an NGL stream.

46. The process of claim 25, wherein at least a portion of the residue stream is passed to a natural gas pipeline.

47. The process of claim 25, wherein the gas mixture is natural gas, the third gaseous component is nitrogen, and the residue stream contains no more than about 4% nitrogen and no more than about 2% carbon dioxide.

48. The process of claim 25, further comprising removing a contaminant material that has been brought into a module housing the separation membrane during operation of steps (a) through (d) by:

(e) discontinuing steps (a) through (d); and (f) flushing the module with an organic solvent.

* * * * *